(12) United States Patent
Jayapalan et al.

(10) Patent No.: US 8,233,409 B2
(45) Date of Patent: Jul. 31, 2012

(54) METHOD, COMPUTER PROGRAM PRODUCT AND APPARATUS FOR PROVIDING NON-INTRUSIVE VOICE OVER INTERNET PROTOCOL (VOIP) MONITORING AND RECORDING

(75) Inventors: Vijay Jayapalan, Irving, TX (US); Mike Metaxas, Oakland Gardens, NY (US); Sundar Padmanabhan, Irving, TX (US); Manvinder Chopra, Carrollton, TX (US); Jim Bartlett, Santa Barbara, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1343 days.

(21) Appl. No.: 11/861,764

(22) Filed: Sep. 26, 2007

(65) Prior Publication Data

US 2009/0080409 A1    Mar. 26, 2009

(51) Int. Cl.
*H04L 12/16* (2006.01)
*H04L 12/66* (2006.01)
*G06F 15/173* (2006.01)
*G06F 11/00* (2006.01)

(52) U.S. Cl. ............ 370/260; 370/356; 709/223; 726/22
(58) Field of Classification Search ....................... None
See application file for complete search history.

(56) References Cited

U.S. PATENT DOCUMENTS

| 7,055,174 | B1 * | 5/2006 | Cope et al. ...................... 726/22 |
| 7,836,160 | B2 * | 11/2010 | Baum ............................ 709/223 |
| 2007/0201454 | A1 * | 8/2007 | Weir et al. ..................... 370/356 |

* cited by examiner

*Primary Examiner* — Melanie Jagannathan

(57) ABSTRACT

An apparatus for non-intrusively monitoring and recording data (e.g., speech data) associated with a call(s) as well as addition and/or removal of a user(s) to/from a communication may include a processor capable of receiving speech data generated by a user of a device that subscribes to a network(s). The processor is further capable of receiving trigger control signals and determining whether the trigger control signals contain data indicating whether recording and monitoring of the data is required as well as addition and/or removal of a user to a communication is required. The processor is further capable of generating one or more copies of the speech data when the determination reveals that the recording and monitoring of the speech data is required and is further capable of generating sound corresponding to the speech data when the determination reveals that the recording and monitoring of the speech data is not required.

23 Claims, 10 Drawing Sheets

METHOD, COMPUTER PROGRAM PRODUCT AND APPARATUS FOR PROVIDING NON-INTRUSIVE VOICE OVER INTERNET PROTOCOL (VOIP) MONITORING AND RECORDING

BACKGROUND INFORMATION

Voice over Internet Protocol (VoIP) allows the conversion of analog audio signals, such as voice signals, into digital data that can be transmitted over a packet-switching network such as the Internet. Currently, VoIP communication systems are becoming more prevalent than circuit-switched telephone networks which are typically implemented by a public switched telephone network (PSTN). Advantages of utilizing a VoIP communication system over a traditional telephone system (e.g., a Plain Old Telephone System or Service) include the ability to manipulate voice data as well as the ease of accessibility to a VoIP network. For example, a user of a VoIP telephone can typically receive incoming calls anywhere that the user can connect to the Internet. In this regard, incoming phone calls can be automatically routed to the VoIP telephone, regardless of where a user is connected to the network. Given that VoIP is location independent and since only an Internet connection is typically needed to acquire a connection to a VoIP provider, call center agents, such as, for example, operators of a telecommunications provider(s), using VoIP telephones can oftentimes work from anywhere in the world with a reliable and fast connection with the Internet.

A VoIP carrier may receive voice signals from its subscribers and from subscribers of other carriers. For instance, these voice signals may correspond to voice data associated with a voice conversation between an operator of the VoIP carrier and a subscriber. The VoIP carrier may find it beneficial to record and monitor the voice conversation between the operator and the subscriber for a variety of reasons. For example, recording and monitoring VoIP call data may be utilized by managers and supervisors for employee teaching and training and performance reviews as well as for verification of data. Recording and monitoring of VoIP call data may also foster sharing of data as well as enhancing the morale of call agents by enabling a way for call agents to listen to their call recordings and know what to improve. Additionally, managers and supervisors of call agents may want to monitor a conversation of the call agent without the call agent's knowledge in order to ensure that the call agent is providing quality service to subscribers. The monitored and recorded VoIP call data may be used by the managers and supervisors to ensure that the call agents are not tweaking their performance reviews. In this regard, there is a need to be able to non-intrusively (i.e., unnoticeably) monitor and record VoIP call data, anywhere within the VoIP network of the VoIP carrier in order to obtain more accurate data, as well as the ability to record the conversation on demand, to stop the recording (for example, during a conversation) and to save data associated with the recording.

DETAILED DESCRIPTION

Exemplary embodiments are described hereinafter with reference to the accompanying drawings, in which exemplary embodiments and examples are shown. Like reference numbers refer to like elements throughout.

One or more embodiments may be implemented as a method(s), a system(s), a device(s), or a computer program product(s). Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Devices, methods and computer program products for non-intrusively recording and/or monitoring of data (e.g., speech data associated with a call) as well as adding and/or removing a user(s) to/from a call are provided in accordance with various exemplary embodiments. Additionally, devices, methods and computer program products for suspension of transmission of incoming audio data effectuating a network level mute is provided in accordance with various exemplary embodiments. In general, devices, methods and computer program products are described for receiving packetized speech data, using a network trigger to determine whether the packetized speech data should be non-intrusively monitored and recorded as well as determining whether one or more users should be added and/or removed to/from a call. Furthermore, devices, methods and computer program products are described for receiving packetized speech data, using a network trigger to determine whether the transmission of packetized speech data should be suspended and drained (i.e., replaced) with newly received data to effectuate a mute capability, at the network.

In certain embodiments referenced herein, a "workstation" or "computing device" may be described. Such a workstation may be, for example, a mainframe, server, desktop, laptop or the like. Additionally, in certain embodiments referenced herein, a "network" or "network system" may be referenced. Such a network system may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
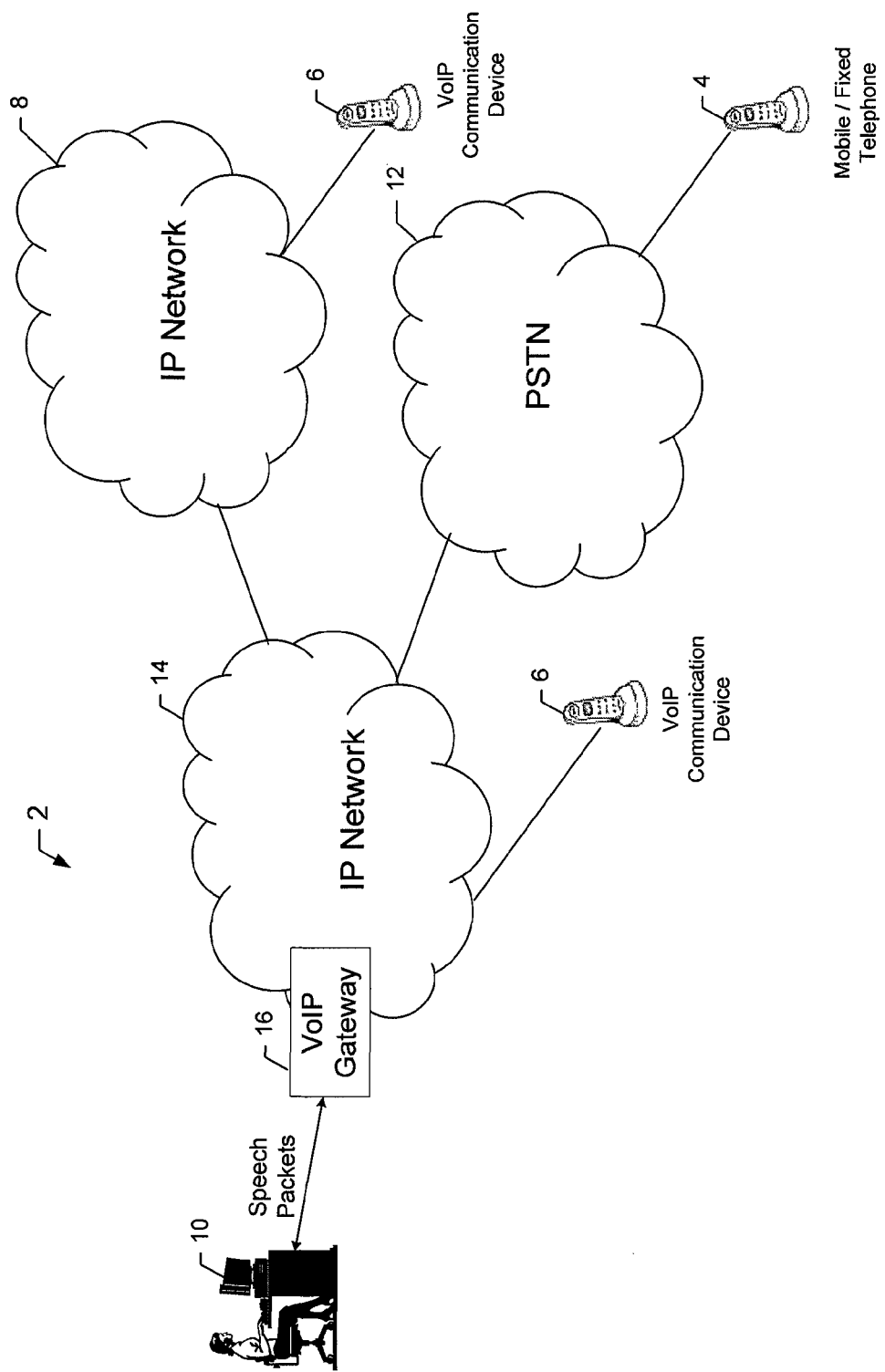
FIG. 1 illustrates a system which facilitates non-intrusive monitoring and/or recording of audio data according to an exemplary embodiment.

Referring to FIG. 1, a network 2 may provide communication between a variety of devices, such as between traditional mobile or fixed telephone 4 and VoIP communication devices 6 as well as between traditional mobile or fixed telephone 4 and a workstation such as workstation 10 (as well as workstations 15 and 70) and VoIP communication devices 6 and a workstation. The network 2 of FIG. 1 includes two Internet Protocol (IP) networks 8, 14 and at least one Public Switched Telephone Network (PSTN) 12, each of which may be serviced by different carriers or service providers. For instance, the IP network 8 may be serviced by Carrier 2, the IP network 14 may be serviced by Carrier 1 whereas the PSTN 12 may be serviced by Carrier 3. The IP networks 8 and 14 are capable of providing VoIP service to various connected VoIP communication devices 6, including but not limited to traditional phones connecting to the VoIP network via analog telephone adapters, IP phones, or computers running appropriate software to enable the connection with the IP network and the like. The VoIP communication devices 6 are capable of sending data (in the form of data packets), including but not limited to voice conversations, video conversation, message or data file exchange in parallel with the voice/video conversation, audio conferencing and the like over the IP networks 8, 14. The PSTN 12 is a circuit-switched telephone network that is capable of providing analog or digital service to traditional mobile or fixed telephones 26. The traditional mobile or fixed telephone 26 is capable of transmitting and receiving signals consisting of speech and/or user generated data over the PSTN.

VoIP gateway 16 may be any device or means embodied in hardware and/or software capable of converting circuit-switched data signals, received from a circuit-switched network (e.g., PSTN 12), to data packets. Moreover, the VoIP gateway 16 may be capable of converting or encoding these data packets into μ-law Real-time Transport Protocol (RTP) data packets, for example, by employing a μ-law algorithm as is well known and sending these RTP data packets to a processor 22 (also referred to herein as packet processor) of the workstation 10 (as well as workstations 15 and 70. (See FIG. 2, FIG. 4 and FIG. 6 and discussion below) Additionally, VoIP gateway 16 may be capable of receiving/transmitting data packets from/to IP networks 8, 14 and converting these data packets to μ-law RTP data packets, for example, which may be sent to the processor 22 of the workstation 10. In this regard, the VoIP gateway 16 may operate as a pass-through encoder switch and as a hub for VoIP data such as, for example, packetized speech data, text data, video data, multimedia data and the like. As referred to herein the RTP defines a standardized packet format for delivering audio and/or video data over packet-based networks such as IP networks 8, 14.

Workstation 10 may be a computer or computing device such as a mainframe, server, desktop, laptop, device or the like having a processing element (such as for example, processor 22) configured to receive μ-law encoded RTP data packets via VoIP gateway 16 from one or more networks corresponding to one or more different carriers (e.g., Carrier 1, Carrier 2 and Carrier 3). The μ-law RTP data streams are capable of including speech data, associated with a voice of one or more users upon making a telephone call with traditional mobile or fixed telephone 4 or VoIP communication device 6.

To illustrate the above, consider the following. A user (e.g., subscriber of PSTN 12, i.e., Carrier 3) of traditional mobile or fixed telephone 4 may make a phone call (such as, for example, by dialing a telephone number for local directory assistance, e.g., 4-1-1) to a call agent (also referred to herein as a directory assistance operator) at workstation 10 of IP network 14 (i.e., Carrier 1). Signals associated with this phone call may be sent to a circuit-switched network such as PSTN 12, which may route the call to VoIP gateway 16 of network 14 which may convert the circuit-switched data signals to data packets. As noted above, the VoIP gateway 16 is capable of converting or encoding these data packets to μ-law RTP data packets that are provided to the processor 22 of workstation 10.

Additionally, a user (i.e., subscriber of IP network 8 (i.e., Carrier 2)) of VoIP communication device 6 may also make a phone call (such as, for example, by dialing a telephone number for local directory assistance, e.g., 4-1-1) to a call agent at workstation 10 of IP network 14 (i.e., Carrier 1). Voice signals associated with this phone call may be sent to a packet-based network such as IP network 8, which may convert the voice signals into digital data in the form of data packets and may send these data packets to VoIP gateway 16 of IP network 14 which is capable of converting or encoding these data packets to μ-law RTP data packets, for example, that are provided to the processor 22 of workstation 10.

Additionally or alternatively, a user (i.e., subscriber of IP network 14 (i.e., Carrier 1)) of VoIP communication device 6 may likewise make a phone call (such as, for example, by dialing a telephone number for local directory assistance, e.g., 4-1-1) to a directory assistance operator (i.e., call agent) at workstation 10 of IP network 14. Voice signals associated with this phone call may be sent to a packet-based network (such as, for example, IP network 14), which may convert the voice signals into digital data in the form of data packets and may send these data packets to VoIP gateway 16 of IP network 14 which is capable of converting or encoding these data packets to μ-law RTP data packets, for example, that are provided to the packet processor of workstation 10.

It should be understood that any number of networks (such as, for example, IP networks and PSTNs) and carriers could be part of the network system 2. As such, the IP networks 8, 14 and the PSTN 12 and Carriers 1, 2 and 3 of FIG. 1 are merely illustrative in nature. For example, in a manner analogous to that described above, the VoIP gateway may generate μ-law RTP data packets associated with a phone call initiated by a user/subscriber of another IP network (not shown) or another PSTN (not shown). Additionally, it should be understood that any number of traditional mobile or fixed telephones 4 and VoIP communication devices 6 may be employed in the network system 2.

Figure 2:
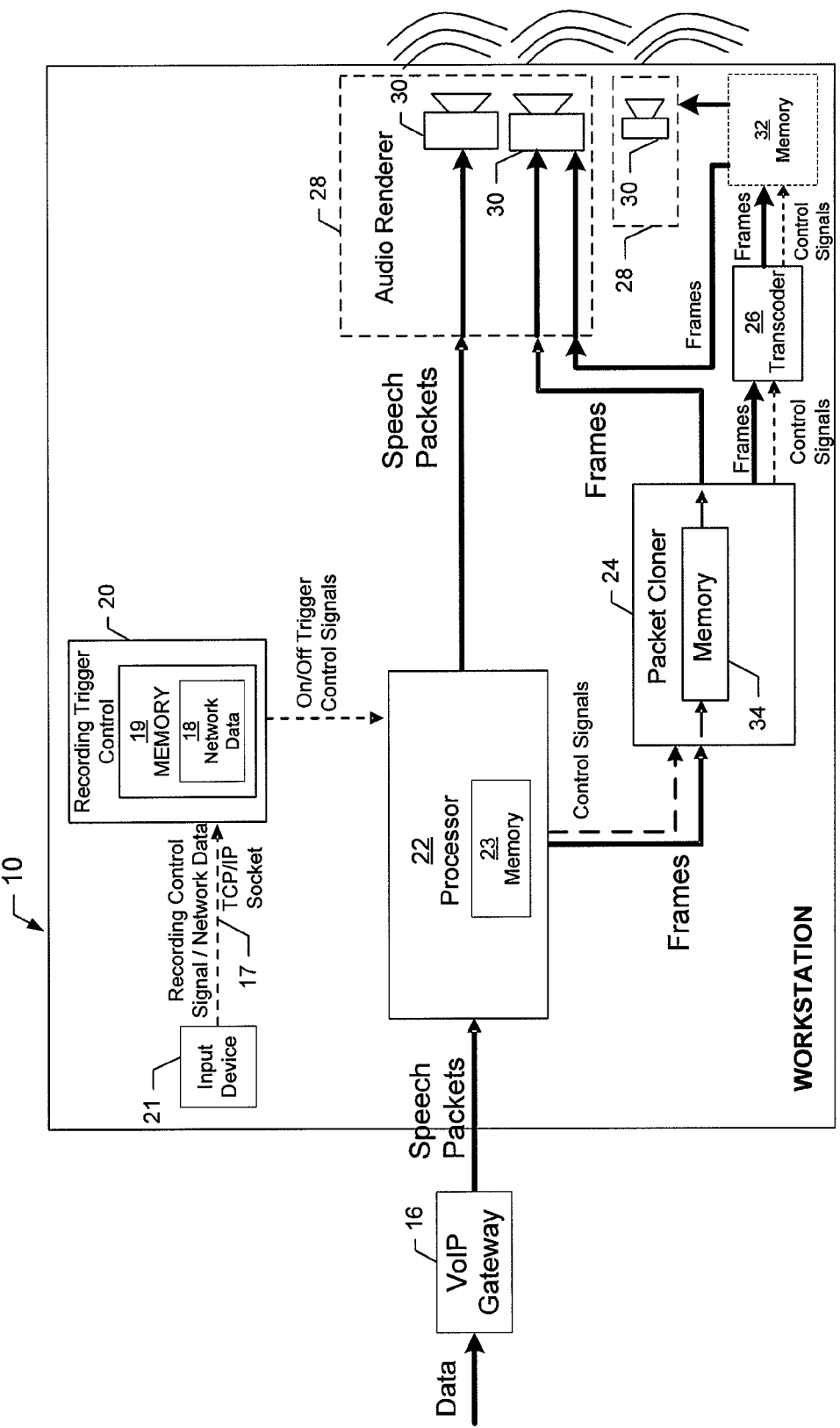
FIG. 2 illustrates a block diagram of an apparatus for non-intrusively monitoring and/or recording of audio data according to an exemplary embodiment.

Referring now to FIG. 2, a workstation 10 for non-intrusively monitoring and/or recording data associated with a call(s) according to an exemplary embodiment is illustrated. It should be pointed out that in the discussion below a user of the VoIP communication device 6 and a user of the mobile/fixed telephone 4 will be made aware that a call, or portions of a call, may monitored or recorded. In FIG. 2 (as well as FIGS. 4 & 6 discussed below), solid lines input to elements and located between elements denote speech data and/or audio data paths (collectively referred to herein as "Speech Packets") whereas dotted lines input to and located between elements denote signaling and/or control information. The workstation 10 includes a TCP/IP socket 17, a recording trigger control 20 (also referred to herein as a network trigger control), a memory 19 (capable of storing network data 18 as well as other data, for example recording control signals), an input device 21, a processor 22, a packet cloner 24, a transcoder 26, a memory 32 and audio renderers 28, which includes one or more speakers 30. The TCP/IP socket 17 may be any device or means embodied in hardware and/or software that is capable of sending or receiving data stream, such as for example data packets, between multiple devices or end points. In this exemplary embodiment, a user such as, for example, a call agent may load recording control signals into the memory 19 of the recording trigger control 20 via the TCP/IP Socket 17. Additionally, a user such as, for example, a technician (or any other suitable user) of the IP network 14 may load network data 18 into the memory 19 via TCP/IP socket 17. The memory 19 may be a Random Access Memory (RAM) for storage of data or any number of pieces of information used by the workstation 10 to implement the functions of the recording trigger control 20. For example, the memory 19 may store the network data 18 and the recording control signals input by one or more user(s) (e.g., a call agent (i.e., a directory assistance operator and e.g., a technician of the IP network 14)).

The recording trigger control 20 may be any device or means embodied in software and/or hardware capable of evaluating data packets, for example, data packets consisting of speech data (also referred to herein as speech packets), received by the processor 22 and determining whether monitoring and/or recording of these data packets is required. In one embodiment, the recording trigger control 20 may be embodied by the processor 22. In an alternative exemplary embodiment, the recording trigger control 20 may be a co-processor capable of evaluating data packets received by the processor 22 and determining whether monitoring or recording of these data packets is required. The recording trigger control 20 is also capable of receiving and examining the data in the recording control signals and the network data 18 to determine whether monitoring and/or recording of the data packets, received by the processor 22, is required. For instance, the network data may comprise network provider (e.g., a provider or Carrier of IP network 14) initiated data instructions for monitoring and/or recording data packets associated with voice conversation relating to a call. For example, the network provider may define the network data 18 as instructions for monitoring and/or recording the first ten phone calls received after a recurring predetermined time (e.g., 6:00 AM) or any other suitable instructions for monitoring and/or recording voice conversation associated with phone calls.

The recording control signals may consist of a command generated by a call agent (who may be a participant to the call) or other agent (including but not limited to another call agent or a supervisor of the call agent(s) who may be a non-participant to the call) of the IP network 14 consisting of instructions to monitor and/or record data packets received by the processor 22. The recording control signals may be generated by a user (e.g., call agent) via input device 21, which may include a keyboard, a mouse, a touch display, button, joystick, controller, or other input device, through which the workstation 10 may receive an input from a user such as, for example, a call agent. In other words, the user may use the input device 21 to generate the data associated with the recording control signals which are received by the recording trigger control 20 via TCP/IP socket 17. For instance, if the user (e.g., call agent (who may be a participant to the call)) decides that a call should be recorded, the user may select a button (for e.g.,) of the input device 21 which causes the input device 21 to send a recording control signal to the recording trigger control 20 so that voice data associated with the call can be monitored and/or recorded. Additionally, the user (e.g., call agent) may use a keyboard or the like of the input device 21 to define instructions for invoking the recording control signals. For example, the user (e.g., call agent) may define instructions relating to sending a recording control signal to the recording trigger control 20 whenever a call is received from a subscriber of IP network 8 or PSTN 12 or any other suitable instruction.

Similarly, a user acting on behalf of the network provider (i.e., IP network 14) such as, for example, a technician who may not be a participant to the call (or e.g., a supervisor of the call agent or the like who may not be a participant to the original call) may decide that a call should be recorded, and the user (e.g., technician, supervisor of the call agent or the like) may, for example, select a button of the input device 21 which causes the input device 21 to send the network data 18 to the recording trigger control 20 so that voice data associated with a call can be monitored and/or recorded. Additionally, the user (e.g., technician, supervisor of the call agent(s)) may use a keyboard or the like of the input device 21 to define instructions in the network data 18 which may be sent by the input device 21 to the memory 19 of recording trigger control 20. The data relating to the instructions in the network data 18 may automatically activate or turn on a control signal, at the recording trigger control 20, relating to an instruction for monitoring and/or recording data packets. (See discussion below) Moreover, the network data 18 may be prestored in memory 19, and changed or modified whenever the provider of the network (i.e., IP network 14) chooses. When the memory 19 of the recording trigger control does not receive a recording control signal and does not receive and store network data 18, the recording trigger control 20 may generate a control signal containing an instruction not to monitor and/or record data packets associated with a call that are received by the processor 22 (See discussion below).

When the recording trigger control 20 determines that monitoring and/or recording of the data packets is required, the recording trigger control is capable of activating or turning a trigger control signal "ON," (also referred to herein as ON trigger control signal) which may be sent to the processor 22. The ON trigger control signal may include data instructing the processor 22 that monitoring and/or recording of received data packets is required. On the other hand, when the recording trigger control 20 determines that monitoring and/or recording of the data packets is not required, the recording trigger control is capable of activating or turning a trigger control signal "OFF," (also referred to herein as OFF trigger control signal) which may be sent to the processor 22. The OFF trigger control signal may include data instructing the processor 22 that monitoring and/or recording of received data packets is not required and may also include data instructing the processor 22 to send the data packets to the speaker 30 (of the audio renderer) which converts signals associated with the data packets to sound.

The processor 22 includes circuitry required for implementing logic and audio functions of the workstation 10. For example, the processor 22 may include a microprocessor, a digital signal processing device and other supporting circuits. Additionally, the processor 22 may include the capability to operate or execute one or more software programs that may be stored in memory 23, which may be a volatile memory such as e.g., a random access memory (RAM) or the like. In an alternative exemplary embodiment, the memory 23 may be a non-volatile memory such as e.g., a read-only memory (ROM), a flash memory, or the like. The processor 22 is capable of receiving μ-law RTP data packets from the VoIP gateway 16 and storing these μ-law RTP data packets in memory 23. The processor 22 is further capable of determining the start and end of audio data and/or speech data included in one or more μ-law RTP data packets that may, for example, be associated with voice conversation or other audio data such as, for example, generic response system (GRS) voice messages i.e., messages generated by the IP network 14. In this regard, the processor 22 is capable of sensing the boundaries of a speech pattern, such as for example, the start and end of voice data associated with a telephone call. The processor 22 is further capable of converting the μ-law RTP data packets (also referred to herein as speech packets and/or data packets) into a form that is audible to a user via the audio renderer 28. For example, the processor 22 is capable of converting the μ-law RTP data packets into a waveform audio format (WAV) (which is an audio file format standard for storing audio on computers) or a Moving Picture Experts Group-1 (MPEG-1) Audio Layer 3 (MP3) (i.e., another audio file format standard for storing audio on computers) file format and the like which enables audio to be played by a speaker 30 of the audio renderer 28 and heard by one or more users such as for example, a directory assistance operator (i.e., call agent).

As noted above, the processor 22 is further capable of receiving trigger control signals such as "ON trigger control signals" and "OFF trigger control signals" from the recording trigger control 20. When the processor 22 receives an ON trigger control signal from the recording trigger control 20, which may include data associated with a notification that monitoring and/or recording of data packets (e.g., the speech packets (i.e., μ-law RTP data packets)), received by the processor 22, is required, the processor 22 may send a control signal to the packet cloner 24, which instructs the packet cloner 24 to monitor and/or record the data packets (i.e., speech packets) associated with data originated by a corresponding carrier (e.g., Carrier 1, Carrier 2 or Carrier 3).

Additionally, as noted above, when the processor 22 receives an "OFF trigger control signal," the processor 22 is capable of sending data packets including but not limited to speech data packets and/or audio data packets, associated with a carrier to the audio renderer 28, which outputs audio associated with the speech/audio data to speaker 30 which plays the corresponding audio so that one or more users such as for example, the call agent can hear the audio (e.g., voice data associated with a voice conversation).

The processor 22 is further capable of arranging the received μ-law data packets into one or more linear frames (also referred to herein as frames) and is capable of sending these frames (which include the data packets containing speech and/or audio data, associated with a call(s) that is generated by one or more carriers) to the packet cloner 24. The packet cloner 24 may be any means or device embodied in hardware and/or software (or a combination of hardware and software) capable of receiving control signals and linear frames, consisting of data packets, sent from the processor 22. In this exemplary embodiment, the packet cloner 24 is located external to the processor 22. However, in an alternative exemplary embodiment, the packet cloner 24 may be located internal to the processor 22 and is thereby embodied by the processor 22. In another exemplary alternative embodiment, the packet cloner 24 may be a co-processor capable of receiving control signals and linear frames, consisting of data packets, sent from the processor 22 and performing the functions described herein below.

The packet cloner 24 may include a memory 34, which is capable of storing the frames received by the processor 22. The memory 34 may be a non-volatile memory such as, for example, a read-only memory (ROM), flash memory, or the like. In an alternative exemplary embodiment, the memory 34 may be a volatile memory such as e.g., a random access memory (RAM), a dynamic random access memory (DRAM), or a static random access memory (SRAM) or the like. The packet cloner 24 is capable of receiving a control signal from the processor 22 which instructs the packet cloner 24 to monitor the frames, consisting of the data packets associated with audio data (e.g., voice conversation data relating to a call) and which are stored in the memory 34 and non-intrusively monitor and generate one or more recordings (i.e., one or more copies or duplicates) of the received frames stored in the memory 34. A participant of the call, such as the call agent may be unaware that the voice data associated with the call is being recorded by the packet cloner 24. In this regard, the generated recordings or copies of the data packets may be non-intrusively generated. The recorded copies of the frames may be stored in memory 34.

The packer cloner 24 is capable of sending the one or more copied (or duplicated) linear frames to the audio renderer 28 as well as the transcoder 26. When a speaker 30 of the audio renderer 28 receives a copy of the frames the speaker 30 converts signals associated with the data packets of the frames to sound which is played by the speaker 30. In this exemplary embodiment, the audio renderer 28 may optionally be located internal to the workstation 10 or external to the workstation 10. Additionally in this exemplary embodiment, the speakers 30 may be located internal to the audio renderer 28. However, in an alternative exemplary embodiment, the speakers 30 may be located external to the audio renderer 28. In this regard, the speakers 30 may consist of an earpiece, earphone, headphone, headset or the like that may be utilized by one or more users such as, for example, a call agent(s) or other user of the IP network 14 (e.g., a call agent's supervisor) to listen to the audio data. While two speakers 30 are shown in the one of the audio renderers 28 and one speaker is shown in another audio renderer 28 of FIG. 2, it should be pointed out that any number of speakers 30 may be included in the audio renderers 28. In this manner, a user (e.g., a call agent who may be a participant to the call) may utilize one of speakers 30 to hear the original audio data (i.e., speech packets that are not copied or recorded), received from processor 22 and which, is associated with a voice conversation relating to a call whereas another user (e.g., another call agent or supervisor of a call agent(s) or the like who may not be an original participant to the call) may utilize another speaker 30 to hear a recorded or copied version of the audio data, received from the packet cloner 24 in real time, that is to say, at the same time as the data packets (i.e., speech packets) sent from the processor 22 are received and being played by the speaker 30.

In this regard, a user who is not a participant to the call (e.g., a call between a call agent and a user of VoIP communication device 6 or traditional mobile/fixed telephone 4) may non-intrusively monitor and listen to the audio associated with the call at the same time that the voice conversation associated with the call is occurring (i.e., in real time) without interrupting the participants of the call (e.g., call agent and user of VoIP communication device 6 or mobile/fixed telephone 4) and without making the participants to the call aware of the exact instance of the conversation that the call is being monitored or recorded. In other words, without making the participants to the call aware of which portion(s) of the call is being monitored or recorded.

Turning now to the packet cloner, the packet cloner 24 is capable of sending frames and control signals to the transcoder 26, which may instruct the transcoder 26 to convert the μ-law RTP data packets in the linear frames to another audible data format, including but not limited to MP3 data or WAV data. Additionally, the packet cloner 24 is capable of sending a control signal to the transcoder 26 which instructs the transcoder 26 not to convert the μ-law RTP data packets of the frames and also instructs the transcoder 26 to send the μ-law data packets of the frames to the memory 32. In this regard, the transcoder 26 may be any device or means embodied in hardware and/or software or a combination or hardware and/or software that is capable of converting data (e.g., audio data) from one format to another or for receiving audio data and sending or transferring the audio data to a memory without converting the audio data to another audible format. In this exemplary embodiment, the transcoder 26 is located external to the packer cloner 24. However, in alternative exemplary embodiment, the transcoder 26 may be located internal to (and be embodied by) the packer cloner 24 and, in some embodiments, by the processor 22. The transcoder 26 is further capable of generating one or more control signals and sending these control signals to the memory 32 and is further capable of sending the converted data packets of the frames as well as unconverted data packets to the memory 32, in the manner discussed above. As such, the memory 32 may store the converted data packets (e.g., data packets convert from μ-law RTP data packets to MP3 data or WAV data) as well as unconverted data packets i.e., μ-law RTP data packets. The transcoder 26 is further capable of assigning a file name to the converted data (e.g., MP3#1, WAV#1) and the unconverted data (e.g., RTP#1) and a date and time that the μ-law RTP packets were received by the processor 22. These file names and the dates and times may be sent with the frames to the memory 32. In this regard, the memory 32 is capable of storing converted and unconverted audio data that may be located by file name and/or by the date and time that the μ-law RTP packets were received by the processor 22 (i.e., the time of a corresponding call(s)).

In an exemplary embodiment, the memory 34 may be a volatile memory, such as for example a random access memory (RAM), a dynamic random access memory (DRAM), a static random access memory (SRAM) or the like capable of storing information, data, content and the like. In an alternative exemplary embodiment, the memory 34 may be a volatile memory such as, for example, a read-only memory (ROM), flash memory, a hard disk, a floppy disk, or optical disc storage devices such as, for example, a compact disc (CD) ROM, a Digital Video Disc (DVD) and the like. Additionally, the memory 34 may be optionally located internal to the workstation 10 (and thereby embodied by the workstation 10) or the memory 34 may be located external to the workstation 10. The converted and unconverted data stored in the memory 32 may optionally be provided to an audio renderer 28. In this regard, the recorded and converted as well as unconverted data associated with a call may be played at a time subsequent (e.g., at a later date) to the original receipt of the data associated with the call, i.e., the data packets (i.e., speech packets) that are sent from the processor 32 to the speaker 30 during the actual call (e.g., a call between a user of VoIP communication device 6 and a call agent of IP network 14).

Additionally, the converted and unconverted data stored in the memory 32 may optionally be provided to another speaker 30 of another audio renderer 28 that may be optionally located internal to the workstation 10 or external to the workstation 10. In this regard, multiple users may non-intrusively (i.e., the participants of the call may be unaware of the exact instance in which the call is being monitored and recorded or unaware of which portion(s) of the call is being monitored or recorded) monitor and listen to the recorded converted data as well as the recorded unconverted data associated with a call between a user such as, for example, a call agent and a user of VoIP communication device 6 (or traditional mobile/fixed telephone 4). It should be understood that each of the audio renderers 28 may include any number of speakers 30.

Figure 3A:
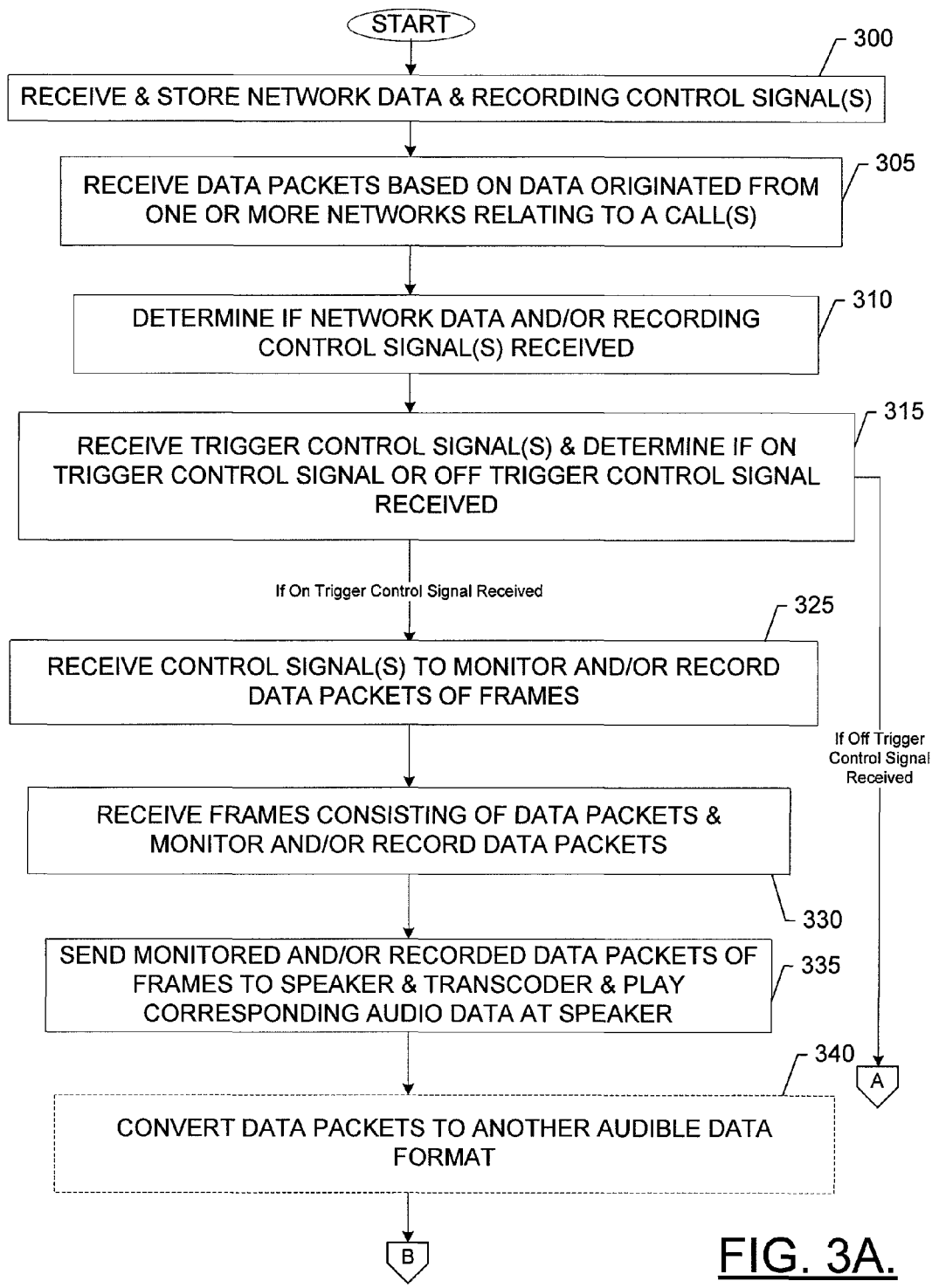
FIGS. 3A and 3B illustrate a flowchart of a method for non-intrusively monitoring and/or recording of audio data according to an exemplary embodiment.
Figure 3B:
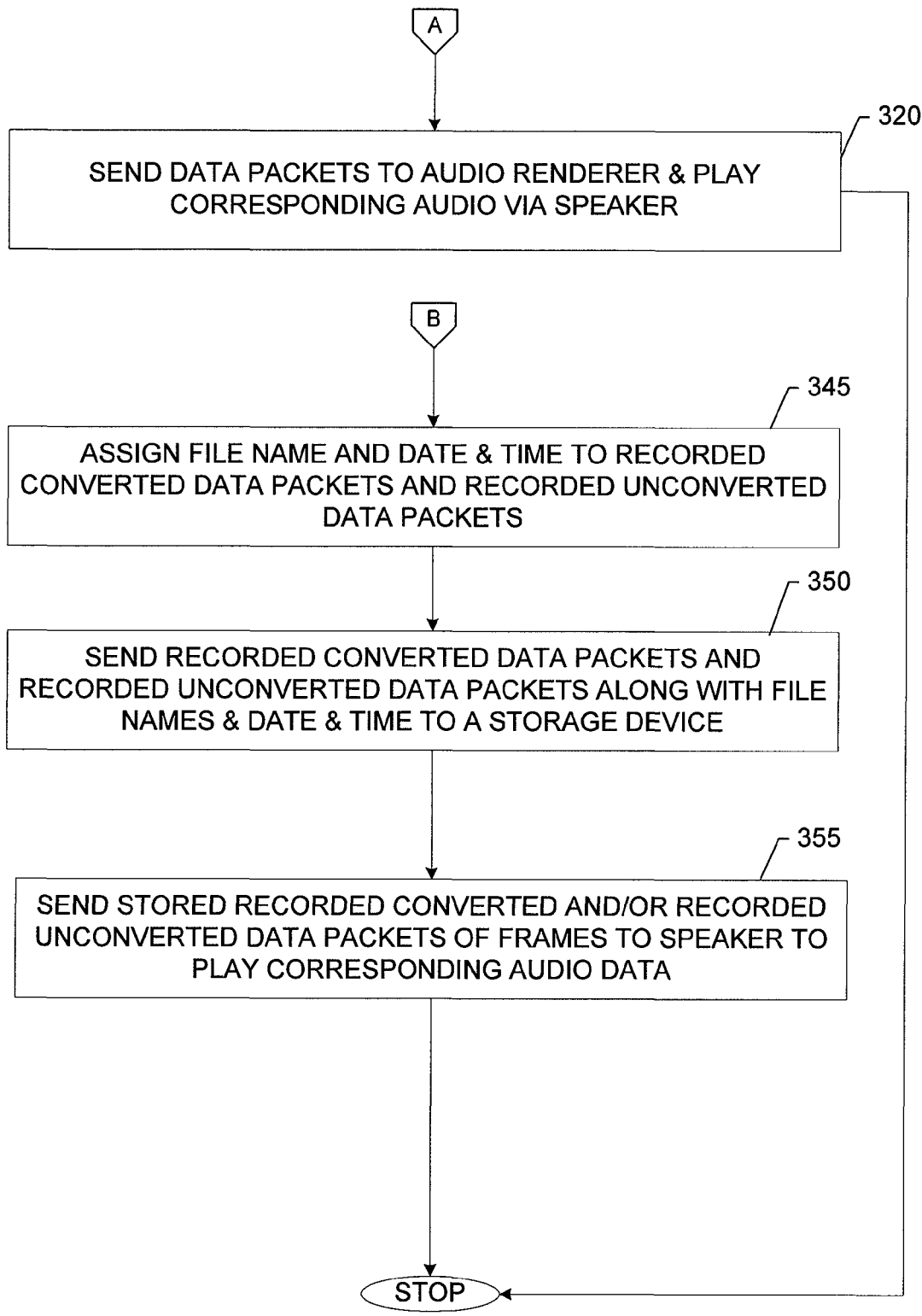

Referring now to FIGS. 3A and 3B, a method of a flowchart for non-intrusively monitoring and/or recording of audio data packets according to an exemplary embodiment is provided. A user such as, for example, a technician who acts on behalf of the network provider (i.e., IP network 14) may load network data 18 into memory 19 of the recording trigger control 20, by utilizing input device 21 to send the network data 18 to the recording trigger control 20 via TCP/IP socket 17. This network data 18 may be prestored in the memory 19 by the user acting on behalf of the IP network 14. As noted above, the network data 18 may define instructions and conditions in which to monitor and/or record data packets received by the processor 22 (for example data packets received during a call). Additionally or alternatively, a user, for example, a call agent of the IP network 14 may utilize the input device 21 to send recording control signals to the recording trigger control 20 which may be stored in memory 19. (Step 300)

When a user of the VoIP communication device 6 of a packet-based network (i.e., IP network 14 or IP network 8) initiates a phone call or is the recipient of a phone call with a user (e.g., call agent) of the IP network 14, data packets (e.g., voice data, such as for example data relating to a voice conversation) associated with the call may be sent to the VoIP gateway 16, which may convert or encode these data packets to μ-law RTP data packets, for example. Alternatively, when a user of the traditional mobile/fixed telephone 4 of a circuit-switched network (i.e., PSTN 12) initiates a phone call or is the recipient of a phone call with a user (e.g., call agent) of the IP network 14, the circuit-switched data (e.g., voice data, such as for example data relating to a voice conversation) associated with the call may be sent to the VoIP gateway 16, which converts the circuit-switched data to data packets and may encode these data packets to μ-law RTP data packets, for example. These μ-law RTP data packets may be received by the processor 22 when sent by the VoIP gateway 16. (Step 305) The recording trigger control 20 (i.e., the network trigger control 20) may examine the memory 19 to determine if there is any network data 18 stored therein and may also determine if a recording control signal(s) has been received and stored in memory 19. (Step 310)

As noted above, a user such as, for example, a call agent who may be a participant of the call(s) (or another user who may not be a participant to the call(s), for e.g., a technician or supervisor of IP network 10) may make a selection (e.g., selecting a button) via input device 21 which activates the recording control signal and is sent to the recording trigger control 20, so that monitoring and/or recording of data (in whole or in part) associated with a call(s) may take place. For instance, the user (e.g., call agent or technician/supervisor) may make the selection before a subsequent (e.g., a next) call is received, at the time the call is received or during the call, or at any other suitable time. As explained below, when the packet cloner 24 monitors and/or records the data packets, associated with a call, the participants of the call (e.g., the call agent and a user of the VoIP communication device 6 or traditional mobile/fixed telephone 4) may be unaware of the exact instance that the monitoring and/or recording of the data packets is to take place, or may be unaware of which portion(s) of the call may be monitored or recorded, particularly in the case where the user such as, for example, the technician or supervisor who are not participants to the call(s) activates the recording control signal. In this regard, the monitoring and/or recording of the data packets associated with the call are non-intrusive to the participants of the call.

Additionally, as noted above, the user (e.g., call agent or technician/supervisor) may define data instructions, via a keyboard or the like of the input device 21, of the recording control signal such that data packets are monitored and/or recorded based on the data instructions in the recording control signal. For example, the recording control signal could contain data instructions requesting monitoring and/or recording of the next five calls that are subsequently received by the workstation 10, via processor 22 or any other suitable data instructions. Again, the monitoring and/or recording of the data packets associated with the next five phone calls received would occur non-intrusively to the participants of the call. In other words, one or more of the participants (e.g., call agent and user of VoIP communication device 6 or traditional mobile/fixed communication device 4) of the next five calls may be unaware of the exact instance that monitoring and/or recording of the data packets associated with the call are taking place or may be unaware of which portion(s) of the call may be monitored or recorded, particularly in the case where the user such as, for example, the technician or supervisor who are not participants to the call(s) activates the recording control signal. The recording and monitoring of the data packets associated with the call(s) occurs without interrupting the voice conversation of the participants to the call (s).

In addition or alternative to the network data 18 being prestored in memory 19, as noted above, a user such as, for example, a technician or supervisor of the network provider (i.e., IP network 14) and who acts on behalf of the network provider may make a selection (e.g., selecting a button) via input device 21, which causes the network data 18 to be sent to the recording trigger control 20, so that monitoring and/or recording of data (in whole or in part) associated with a call(s) may take place based on data such as instructions of the network data 18.

As noted above, the user (e.g., technician/supervisor or any other person) may define the data instructions of the network data, via a keyboard or the like of the input device 21 and may send the network data 18 to the recording trigger control 20, via TCP/IP socket 17, before a subsequent (e.g., a next) call is received, at the time the call is received or during the call, or at any other suitable time. The network data 18 may include data instructions specifying the conditions in which the monitoring and/or recording of data packets associated with one or more calls is to take place. For example, the data instructions of the network data 18 may consist of instructions to monitor and/or record all calls generated by a user of IP network 8 and/or PSTN 12. As discussed below, when the packet cloner 24 monitors and/or records the data packets, associated with a call(s), based on the instructions in the network data 18, the participants of the call (e.g., the call agent and a user of the VoIP communication device 6 or traditional mobile/fixed telephone 4) may be unaware of the exact instance that the monitoring and/or recording of the data packets is taking place, or may be unaware of which portion(s) of the call may be monitored or recorded. In this regard, the monitoring and/or recording of the data packets associated with the call(s) are non-intrusive to the participants of the call(s).

If the recording trigger control 20, determines that a recording control signal is received and stored in memory 19 or that the network data 18 is stored in memory 19, the recording trigger control 20 activates or turns a trigger control signal "ON," i.e., the ON trigger control signal, which may be sent to the processor 22. The ON trigger control signal may include data instructing or notifying processor 22 that monitoring and/or recording of the data packets associated with one or more calls is required. For instance, the recording control trigger 20 activates the ON trigger control signal when the recording control signal is activated and received as well as based on the data instructions in the recording control signal and the data instructions in the network data 18. On the hand, if the recording trigger control 20 examines the memory 19 and determines that there is no network data 18 stored in the memory 19 and that no recording control signal is received and stored in memory 19, the recording trigger control 20 generates an OFF trigger control signal, which may be sent to the processor 22. (Step 315) The OFF trigger control signal may include data which instructs the processor 22 to send the data packets (i.e., speech packets) associated with the call to a speaker 30 of the audio renderer 28 which plays the corresponding audio data so that the audio can be heard or listened to, for example, by the call agent and the user of the VoIP communication device 6 or the traditional mobile/fixed mobile telephone. (Step 320)

The processor 22 may arrange the received data packets associated with one or more calls into frames. When the processor 22 receives the ON trigger control signal from the recording trigger control 20, the processor 22 may send a control signal(s) to the packet cloner 24 to monitor and/or record data packets, associated with one or more calls, and received by the processor 22. The control signal(s) sent by the processor 22 to the packet cloner 24, may include data instructing the packet cloner 24 to monitor and/or record (in whole or in part) data packets associated with a currently received call or one or more other calls (e.g., subsequently received calls or calls made at a predetermined time or the like) based on the instructions in the recording control signal and/or the network data 18. (Step 325)

The processor 22 may send the frames to the packet cloner 24 and the packet cloner 24 may monitor and/or record the frames consisting of data packets associated with one or more calls according to the instructions contained in the control signal(s) sent by the processor 22 to the packet cloner 24. (Step 330) The packet cloner 24 may send these monitored and/or recorded frames to a speaker 30 of an audio renderer 28, which enables the audio associated with the recorded frames to be listened to by a user such as, for example, a user who is not a participant of the call(s) (e.g., the technician/supervisor of the call agent) and the packet cloner 24 may also send the recorded frames to the transcoder 26. (Step 335) Based on the instructions in the control signals sent by the packet cloner 24 to the transcoder 26, the transcoder 26 may optionally convert μ-law RTP data packets of the received frames to one or more different audible formats, including but not limited to MP3 data and WAV data or the like. (Step 340)

For instance, the packet cloner 24 may send a control signal(s) to the transcoder 26, which may instruct the transcoder 26 to convert the μ-law RTP data packets in the frames to another audible data format. Additionally, the packet cloner 24 is capable of sending a control signal(s) to the transcoder 26 which instructs the transcoder 26 not to convert the μ-law RTP data packets of the frames to another audible format. The transcoder 26 is capable of assigning a name (e.g., MP3#1, WAV#1) to the recorded converted data packets and the recorded unconverted data packets (e.g., RTP#1) of the frames and assigning a date and time (e.g., a timestamp such as e.g., Sat. Jul. 21, 2007, 7:00 AM) that the μ-law RTP packets were received by the processor 22. (Step 345) These recorded converted and recorded unconverted data packets of the frames along with their associated names (e.g., file names) as well as the dates and times of original receipt by the processor 22 (e.g., the actual time of a call(s) may be sent to the memory 32 where they are stored. (Step 350) The memory 32 may store the recorded converted or the recorded unconverted data packets, according to their names, for example.

The memory 32 may optionally send one or more recorded converted and/or recorded unconverted data packets of the frames to a speaker 30 of an audio renderer 28, which converts signals corresponding to the data packets to sound that is played so that a user can listen to the audio data, associated with one or more calls for example. (Step 355) Since these converted and unconverted data packets may be stored in memory 32 and output to a speaker 30 of audio renderer 28, data associated with calls may be listened to by a user at a time subsequent to the actual call(s).

Figure 4:
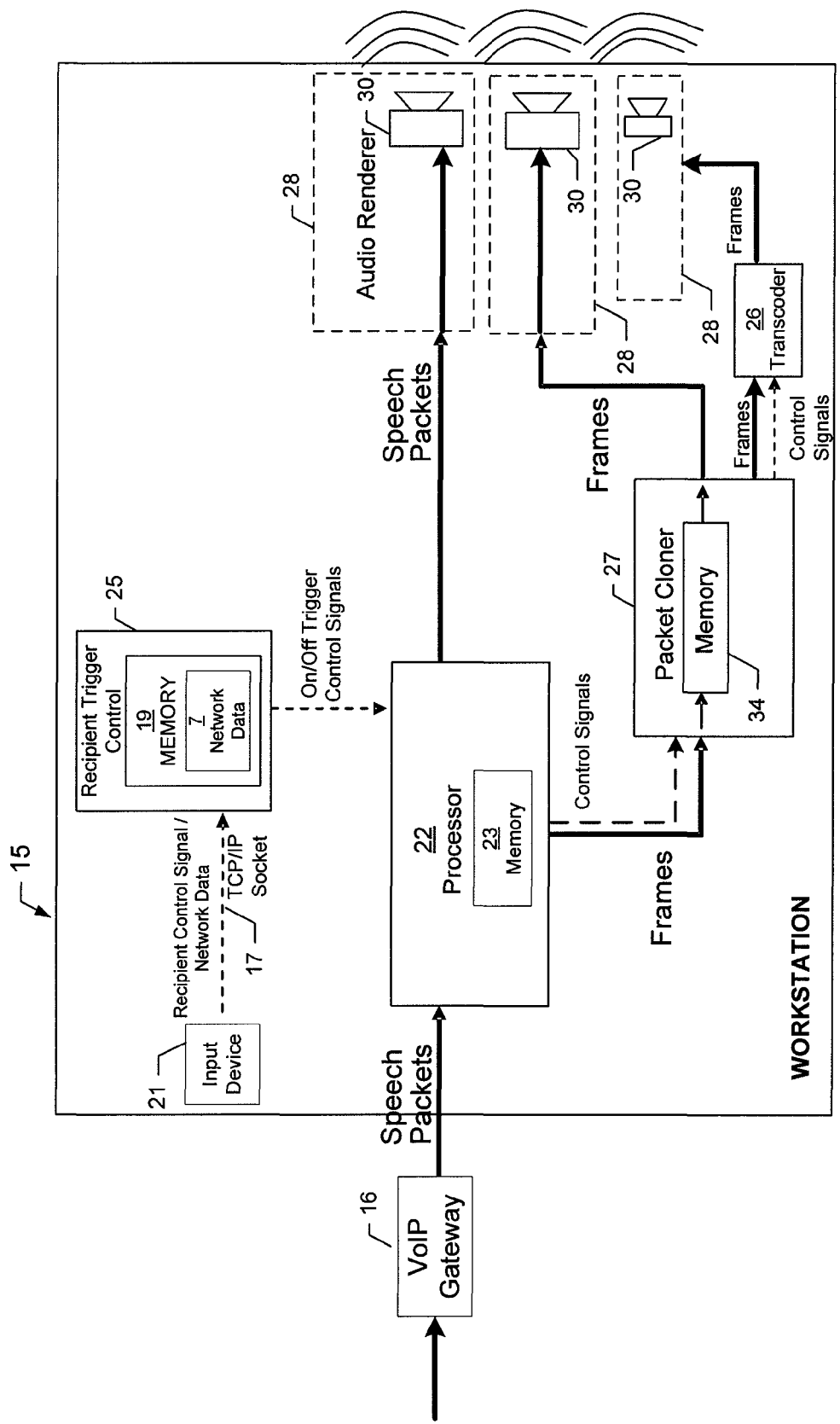
FIG. 4 illustrates a block diagram of an apparatus for non-intrusively adding and/or removing users to/from a call (s) according to an exemplary embodiment.

Referring now to FIG. 4, a workstation 15 for non-intrusively adding and/or removing users to/from a call(s) according to an exemplary embodiment is provided. It should be understood in the discussion below that a user of VoIP communication device 6 and mobile/fixed telephone 4 will be made aware that users may be added and/or removed from a call(s). The workstation 15 includes a TCP/IP socket 17, a recipient trigger control 25, a memory 19 (capable of storing network data 7 as well as other data, for example recipient control signals), an input device 21, a processor 22, a packet cloner 24, a transcoder 26, a memory 32 and audio renderers 28, which includes one or more speakers 30. The TCP/IP socket 17 may be any device or means embodied in hardware and/or software that is capable of sending or receiving data stream, such as for example data packets, between multiple devices or end points. In this exemplary embodiment, a user such as, for example, a call agent may load recipient control signals into the memory 19 of the recipient trigger control 25 via the TCP/IP Socket 17. Additionally, a user such as, for example, a technician (or any other suitable user who acts on behalf of the IP network 14) of the IP network 14 may load network data 7 into the memory 19 via TCP/IP socket 17. In this regard, the network data 7 may be network initiated data.

The recipient trigger control 25 may be any device or means embodied in software and/or hardware capable of evaluating data packets, for example, data packets consisting of speech data (also referred to herein as speech packets), received by the processor 22 and determining whether monitoring and/or recording of these data packets is required and also determines whether to add and/or remove one or more users (who may not be original participants to a call) to/from a call. In this regard, a two party call can be transformed into a multiparty call (e.g., a conference call). In one embodiment, the recipient trigger control 25 may be embodied by the processor 22. In an alternative exemplary embodiment, the recipient trigger control 20 may be a co-processor capable of evaluating data packets received by the processor 22 and determining whether monitoring and/or recording of data packets is required as well as determining whether to add and/or remove one or more users to/from a call(s).

Particularly, the recipient trigger control 25 is also capable of receiving and examining data in the recipient control signals and the network data 7 to determine whether monitoring and/or recording of the data packets, received by the processor 22, is required and whether addition and/or removal of one or more users to a call is required. For instance, the network data 7 may comprise network provider (e.g., a provider or Carrier of IP network 14) initiated data instructions for recording data packets associated with voice conversation relating to a call and adding and/or removing one or more users to/from the call. For example, the network provider may define the network data 7 as instructions for monitoring and recording the first ten phone calls received after a recurring predetermined time (e.g., 7:00 AM) and adding a supervisor (e.g., of a call agent) as a recipient to each of the first ten phone calls received or any other suitable instructions for monitoring and recording voice conversation and adding and/or removing one or more users to/from a call(s).

The recipient control signals may consist of a command generated by a user such as a call agent (who may be an original participant to a call) or another user (including but not limited to another call agent or a supervisor of the call agent(s) who wish to be added to the call(s)) of the IP network 14 consisting of instructions to monitor and record data packets received by the processor 22 and also add and/or remove one or more users to/from the call. The recipient control signals may be generated by a user (e.g., call agent, supervisor, technician, etc.) via input device 21. The user may use the input device 21 to generate the data associated with the recipient control signals which are received by the recipient trigger control 25 via TCP/IP socket 17. For instance, if the user (e.g., call agent (who may be an original participant to the call) or supervisor of the call agent) decides that a call(s) should be recorded and that another user should be added and/or removed to/from the call, the user may select a button (for e.g.) of the input device 21 which causes the input device 21 to send a recipient control signal to the recipient trigger control 25 so that voice data associated with the call can be monitored and recorded and one or more users can be added or removed to/from the call. Additionally, the user (e.g., call agent) may use a keyboard or the like of the input device 21 to define instructions for invoking the recipient control signals. For example, the user (e.g., call agent) may define instructions relating to sending a recipient control signal to the recipient trigger control 20 when the next seven calls are received and the data may specify, for example, to add one or more users (e.g., a supervisor of call agent or a subscriber of IP network 14, etc.) to the next seven calls or any other suitable instruction(s).

The data relating to the instructions in the network data 7 may automatically activate or turn on a control signal, at the recipient trigger control 25, relating to an instruction for monitoring and recording data packets as well as adding or removing one or more users to/from a call. The network data 7 may be prestored in memory 19, and changed or modified whenever the provider of the IP network 14 chooses. When the memory 19 of the recipient trigger control 25 does not receive a recipient trigger control signal(s) and does not receive and store network data 7, the recipient trigger control 25 generates a control signal containing an instruction not to monitor and record data packets and not to add or remove any users to/from a respective call.

When the recipient trigger control 20 determines that recording of the data packets and addition or removal of one or more users to a call is required, the recipient trigger control 25 is capable of activating or turning a trigger control signal "ON," (also referred to herein as ON recipient trigger control signal) which may be sent to the processor 22. The ON recipient trigger control signal may include data instructing the processor 22 that monitoring and recording of received data packets as well as addition or removal of one or more users to a call is required. Alternatively, when the recipient trigger control 25 determines that monitoring and recording of the data packets as well as addition or removal of one or more users is not required, the recipient trigger control 25 is capable of activating or turning a trigger control signal "OFF," (also referred to herein as OFF recipient trigger control signal) which may be sent to the processor 22. The OFF recipient trigger control signal may include data instructing the processor 22 that monitoring and recording of received data packets as well as addition or removal of one or more users to a call is not required and may also include data instructing the processor 22 to send the data packets to the speaker 30 (of the audio renderer) which converts signals associated with the data packets to sound so that a user can listen to the associated audio data.

As noted above, the processor 22 is further capable of receiving trigger control signals such as the "ON recipient trigger control signals" and the "OFF recipient trigger control signals" from the recipient trigger control 25. When the processor 22 receives an ON recipient trigger control signal from the recipient trigger control 25 (which may include data associated with a notification that monitoring and recording of data packets received by the processor 22, is required as well as data indicating that addition and/or removal of one or more users to/from a call is required) the processor 22 may send a control signal to the packet cloner 27, which instructs the packet cloner 27 to monitor and record the data packets associated with the call as well as add and/or remove a user(s) to/from the call(s).

Additionally, as discussed above, when the processor 22 receives an OFF recipient trigger control signal, the processor 22 is capable of sending data packets including but not limited to speech data packets and/or audio data packets, associated with a carrier to the audio renderer 28, which outputs audio associated with the speech/audio data to speaker 30 which plays the corresponding audio so that one or more users such as for example, the call agent can listen to the audio data (e.g., voice data associated with a voice conversation).

As noted above, the processor 22 is capable of arranging received μ-law data packets into one or more frames and is capable of sending these frames to the packet cloner 27. The packet cloner 27 may be any means or device embodied in hardware and/or software (or a combination of hardware and software) capable of receiving control signals and frames, consisting of data packets, sent from the processor 22. In this exemplary embodiment, the packet cloner 27 is located external to the processor 22. However, in an alternative exemplary embodiment, the packet cloner 27 may be located internal to the processor 22 and is thereby embodied by the processor 22. In another exemplary alternative embodiment, the packet cloner 27 may be a co-processor capable of receiving control signals and frames, consisting of data packets, sent from the processor 22 and performing the functions described herein below.

The packet cloner 27 may include a memory 34, which is capable of storing the frames received by the processor 22. The packet cloner 27 is capable receiving a control signal from the processor 22 which instructs the packet cloner 27 to monitor the frames, consisting of the data packets associated with audio data and which are stored in the memory 34 and non-intrusively monitor and generate one or more recordings (i.e., copies or duplicates) of the received frames stored in the memory 34. The recorded copies of the frames may also be stored in memory 34.

The control signal sent from the processor 22 and received by the packet cloner 27 may also instruct the packet cloner 27 to add and/or remove one or more users to a respective call based on an IP address of equipment corresponding to the one or more users. For instance, the control signal may contain an IP address unique to an electronic device (e.g., audio renderer 28) of the one or more users to be added and/or removed. The added or removed users may be users who are not original participants to the call.

The packet cloner 27 may receive a control signal from the processor 22 which instructs the packet cloner 27 to add a user(s) (e.g., supervisor, technician, etc.) to a call. Based on this control signal, the packet cloner 27 is capable of sending the one or more copied (or duplicated) frames, corresponding to voice data of the call, to an audio renderer 28 having an IP address associated with the added user (e.g., the call agent's supervisor). In this regard, when the one or more copied frames are sent to the IP address of the electronic device of the added user(s), a speaker 30 of the audio renderer 28 receives a copy of the frames and converts digital signals associated with the data packets of the frames to analog data signals which generates sound that is played by the speaker 30 so that the added user(s) can listen to the voice data associated with a call. On the other hand, the packet cloner 27 may receive a control signal from the processor 22 which instructs the packet cloner 27 to remove a user(s) (e.g., call agent, supervisor, technician, etc.) from a call. In this regard, the packet cloner 27 is capable of removing a user(s) (e.g., supervisor, technician, etc.) from a call by removing a connection between the packet cloner 27 and an electronic device (e.g. audio renderer 28) of a corresponding user. Additionally, the packet cloner 27 may receive a control signal from processor 22 instructing the packet cloner 27 to send one or more copied frames to the transcoder 26. For instance, this control signal may also include data notifying the packet cloner 27 that transcoding of the copied frames is required. In this exemplary embodiment, the audio renderers 28 may optionally be located internal to the workstation 15 or external to the workstation 15, for example, the audio renderers may be located at another workstation 15. Additionally, in this exemplary embodiment, the speakers 30 may be located internal or external to the audio renderer 28. Although one speaker 30 is shown in each one of the audio renderers 28 of FIG. 4, it should be pointed out that any number of speakers 30 may be included in the audio renderers 28. In this manner, a user (e.g., a call agent who may be an original participant to the call) may utilize one of speakers 30 to hear the original audio data in real time (i.e., received speech packets that are not copied or recorded) that is received from processor 22 and which, is associated with a voice conversation relating to a call. Also, another user (e.g., another call agent or supervisor of a call agent(s) or the like who may not be an original participant to the original call) may utilize another speaker 30 to hear a recorded or copied version of the audio data, received from the packet cloner 24 in real time, that is to say, at the same time as the data packets (i.e., speech packets) sent from the processor 22 are received.

When the packet cloner 27 receives a control signal from processor 22 instructing the packet cloner 27 that transcoding of the data packets of the frames is required, the packet cloner 27 is capable of sending one or more copied frames and a control signal(s) to the transcoder 26 which may optionally instruct the transcoder 26 to convert the μ-law RTP data packets to another audible format such as for example, WAV data or MP3 data or the like (i.e., the copied frames are not required to be transcoded by transcoder 26) and also instructing the packet cloner 27 to add and/or remove another user to/from a respective call(s). For instance, once the transcoder 26 converts or transcodes the μ-law RTP data packets to another audible format, the transcoder 26 is capable of sending these copied and converted frames to an electronic device such as, for example audio renderer 28, having an IP address associated with an added user, which plays audio data associated with a call in real time according to the different audible format (e.g., WAV data). Moreover, since the processor 22 may send the packet cloner 27 a control signal instructing the packet cloner 27 that transcoding of the copied frames are not required, the transcoder 26 is capable of send these copied and unconverted frames to an electronic device such as, for example audio renderer 28, having an IP address associated with an added user, which plays audio data associated with a call in real time.

As noted above, the packet cloner 27 may receive a control signal from the processor 22 instructing the packet cloner 27 to remove a user(s) (e.g., call agent, supervisor, technician, etc.) from a call. In this regard, the packet cloner 27 is capable of sending a control signal to the transcoder 26 instructing the transcoder 26 to remove a user(s) (e.g., supervisor, technician, etc.) from a call by removing a connection between the transcoder 26 and an electronic device (e.g. audio renderer 28) of a corresponding user, for example a user that was previously added to the call.

In view of the foregoing, one or more of the original participants of the call(s) may be unaware of the exact instance in which the voice data associated with the call is being recorded or may be unaware of which portion(s) of the call may be recorded by the packet cloner 24 and the exact instance in which one or more other users are being added or removed to the call(s) by the packet cloner 27. In this regard, the recordings or copies of the data packets are non-intrusively generated and the one or more users may be non-intrusively added and/or removed to/from a call, i.e., without the original participants knowing the exact instance that other users were added or removed from the call.

Figure 5A:
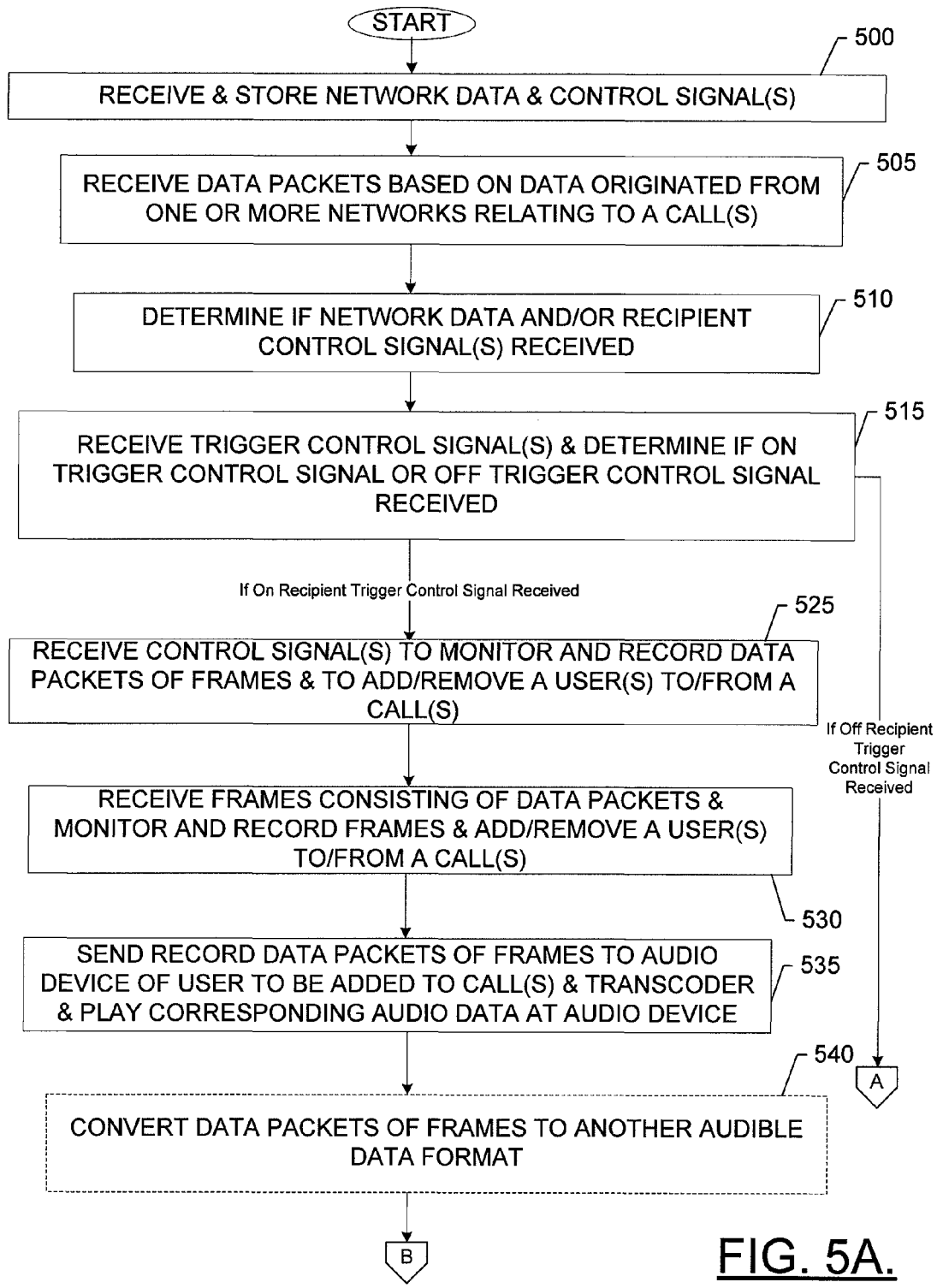
FIGS. 5A and 5B illustrate a flowchart of a method for non-intrusively adding and/or removing users to/from a call (s) according to an exemplary embodiment.
Figure 5B:
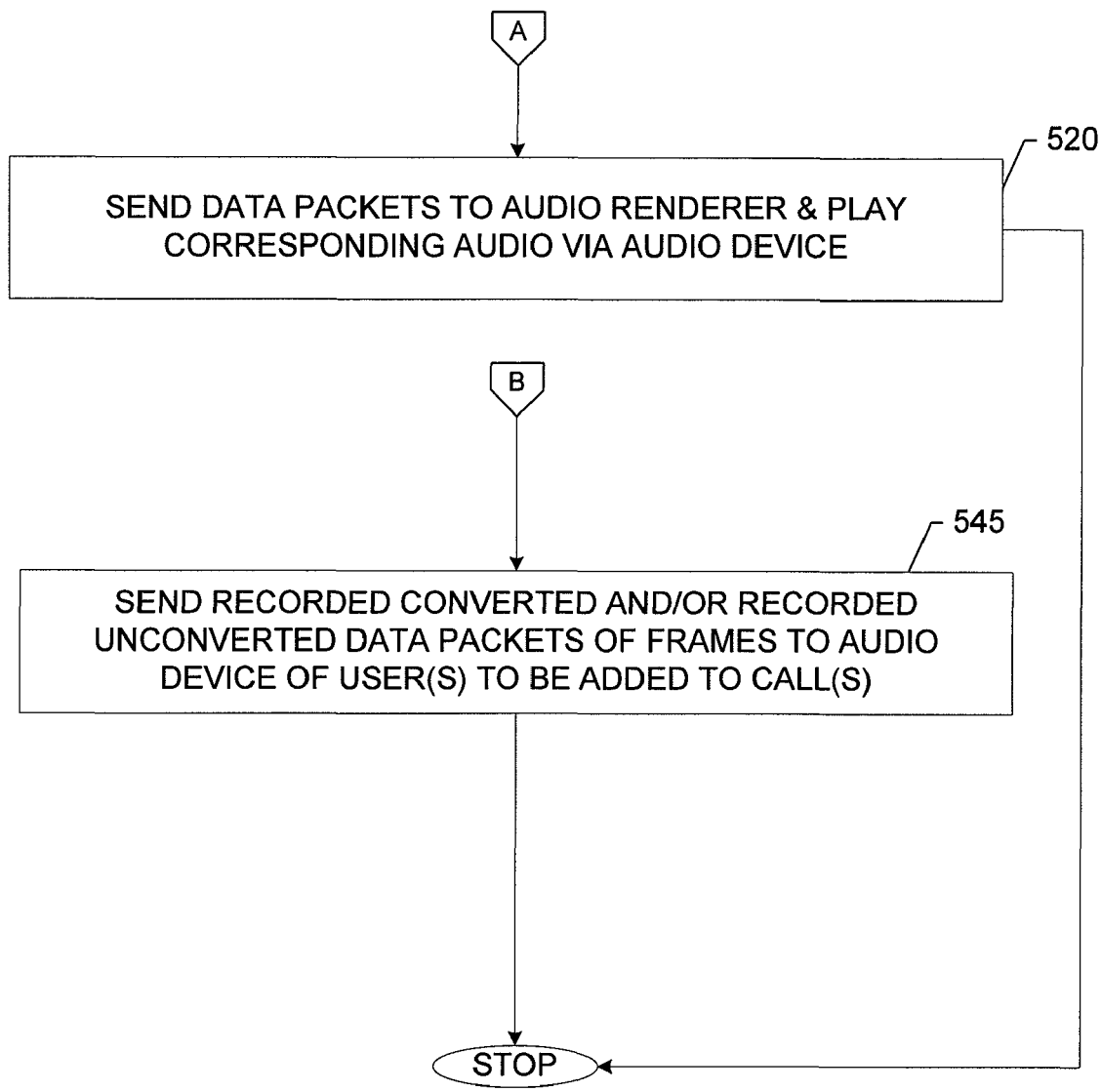

Referring now to FIGS. 5A and 5B, a method for non-intrusively adding and/or removing users to/from a call(s) according to an exemplary embodiment is provided. A user such as, for example, a technician who acts on behalf of the network provider i.e., IP network 14, may load network data 7 into memory 19 of the recipient trigger control 27 by utilizing input device 21 to send the network data 7 to the recipient trigger control 27 via TCP/IP socket 17. This network data 7 may be prestored in the memory 19 by the user acting on behalf of the IP network 14. As discussed above, the network data may define instructions and conditions in which to monitor and record data packets as well as add and/or remove users to/from a call(s). Additionally or alternatively, a user, who may be a participant to an original call (e.g., a call agent) may utilize the input device 21 to send recipient control signals to the recipient control trigger 25, which may be stored in memory 19. (Step 500)

When a user of the VoIP communication device 6 of a packet-based network (i.e., IP network 14 or IP network 8) initiates a phone call or is the recipient of a phone call with a user (e.g., call agent) of the IP network 14, data packets (e.g., voice data, such as for example data relating to a voice conversation) associated with the call may be sent to the VoIP gateway 16, which may convert or encode these data packets to μ-law RTP data packets, for example. Alternatively, when a user of the traditional mobile/fixed telephone 4 of a circuit-switched network (i.e., PSTN 12) initiates a phone call or is the recipient of a phone call with a user (e.g., call agent) of the IP network 14, the circuit-switched data (e.g., voice data, such as for example data relating to a voice conversation) associated with the call may be sent to the VoIP gateway 16, which converts the circuit-switched data to data packets and may encode these data packets to μ-law RTP data packets, for example. These μ-law RTP data packets may be received by the processor 22 when sent by the VoIP gateway 16. (Step 505) The recipient trigger control 25 may examine the memory 19 to determine if there is any network data 7 stored therein and may also determine if a recipient control signal(s) has been received and stored in memory 19. (Step 510)

The processor 22 determines whether an ON trigger recipient control signal or an OFF recipient trigger control signal is received from the recipient trigger control 25. (Step 515) If the OFF recipient trigger control signal is received by processor 22, the processor 22 sends data packet (i.e., speech packets) associated with a call stored in memory 23 to the speaker 30 of an audio renderer 28 which converts digital signals of the data packets to analog audio signals and plays the corresponding sound associated with audio signals so that a user can listen to the sound. (Step 520) When the OFF recipient trigger control signal is received by processor 22, the packer cloner 27 is bypassed and no user who is not an intended original participant of the call(s) is added and/or removed to/from the call.

When the processor receives the ON recipient trigger control signal from the recipient trigger control 25, the processor 22 sends a control signal to the packet cloner 27 to monitor and record data packets associated with one or more calls received by the processor 22 as well as to add and/or remove one or more users to/from the call(s). (Step 525) As noted above, the processor 22 arranges received data packets into frames. As such the processor 22 may send these frames, consisting of data packets associated with a call, to the packet cloner 27. Based on the control signal received by the packet cloner 27 from the processor 22, the packet cloner 27 monitors and records the received frames and based on data in the control signal the packet cloner 27 is capable of adding one or more users to a call(s). For instance, data in the control signal may specify a number of IP addresses of electronic devices corresponding to users to add to the call. Additionally, based on the data in the control signal received by the packet cloner 27 from the processor 22, the packet cloner 27 may remove a user(s) from a call. For instance, data in the control signal may specify to remove a connection with one or more IP addresses of electronic devices. The packet cloner 27 may remove a user(s) from a call by disconnecting a communication path between the packet cloner 27 and the electronic device (e.g., audio renderer 30) having the IP address corresponding to the user (e.g., a technician of IP network 14) that is to be removed from the call(s). (Step 530)

Additionally, when the packet cloner 27 adds a user(s) to a call(s) (e.g., a supervisor of the call agent), the packet cloner 27 sends the copied frames to an IP address of an electronic device i.e., an audio renderer 28. The speaker 30 of the audio renderer 28 converts the data signals of the data packets in the frames to audio analog signals that are played via speaker 30 so that the added user(s) can listen to the conversation between the original intended participants to the call. In this regard, a user who may not be an original intended participant(s) (e.g., call agent and user of VoIP communication device 6) of the call is non-intrusively added (i.e., without interrupting the call and without the original participants knowing the exact instance in which user is added to the call) to the call and may listen to the voice conversation between the original participants of the call. Additionally, the packet cloner 27 may send copied or recorded frames and one or more control signals to the transcoder 26. (Step 535)

The control signal sent from the packet cloner 27 to the transcoder 26 may include data instructing the transcoder 26 to convert the copied frames to another audible format and also may contain data instructing the transcoder 26 to add a user(s) to a call based on data identifying an IP address of an electronic device contained within the received control signal. In this regard, the transcoder 26 may optionally transcode or convert the data packets of the received frames to another audible format (e.g. WAV data, MP3 data or the like). (Step 540) Additionally, the copied and converted or unconverted data packets of the frames may be sent by the transcoder 26 to an IP address of an electronic device, i.e., audio renderer 28 corresponding to a user to be added to the call. As such, the speaker 30 of the audio renderer 28 converts digital data signals of the data packets to analog audio signals which are played via speaker 30 so that the added user(s) can non-intrusively listen to the voice conversation of the original participants to the call in real time. (Step 545)

Figure 6:
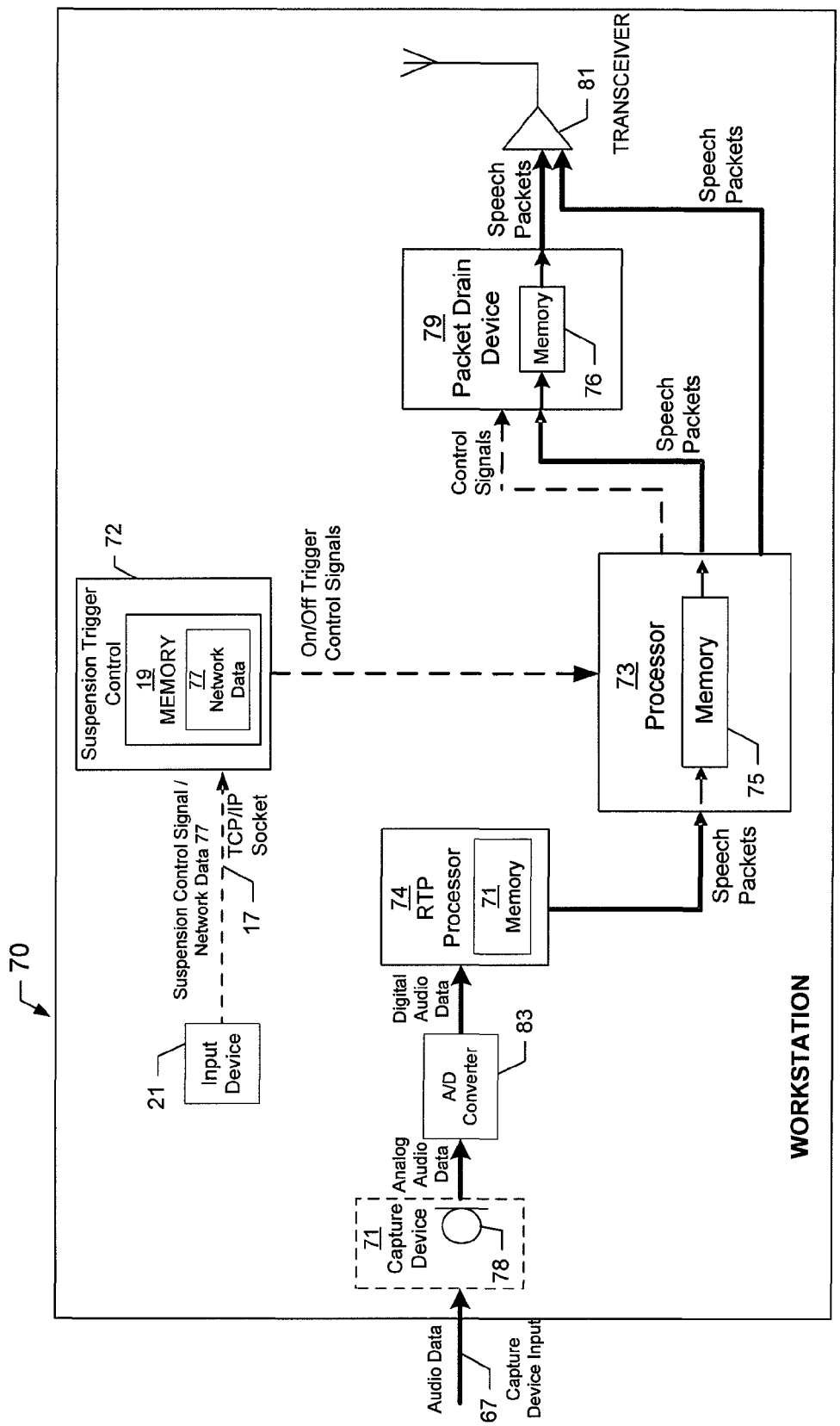
FIG. 6 illustrates a block diagram of an apparatus for suspension of transmission of incoming audio data which effectuates a network level mute according to an exemplary embodiment.

Referring now to FIG. 6, a workstation 70 for suspension of transmission of incoming audio data which effectuates a network level mute according to an exemplary embodiment is provided. It should be pointed out that in the discussion below users of the VoIP communication device 6 and the mobile/fixed telephone 4 will be aware that portions of a conversation associated with a call may be muted. The workstation 70 includes an input device 21, a TCP/IP socket 17, a suspension trigger control 72, a capture device input 67, a capture device 71, which may include a microphone 78, an analog-to-digital (A/D) converter 83, an RTP processor 74, a processor 73, a packet drain device 79 and a transceiver 81. The microphone 78 of the capture device 71 may be any device or means in hardware capable of sensing or detecting sound and converting the sound into data signals, for example, analog audio data signals. For instance, when a user (e.g., call agent) speaks into the capture device input 67 (for example during a call), the microphone 78 may be capable of sending the user's voice (i.e., voice data) and converting the sound of the user's voice into analog audio data signals. The capture device 71 may be capable of sending these analog audio data signals to the A/D converter 83 which converts the analog audio data signals to digital audio data signals that the A/D converter provides to the RTP processor 74.

The RTP processor 74 may be comprised of a microprocessor device or a controller or the like capable of executing program instructions and processing data. The RTP processor 74 is further capable of receiving digital audio data from the A/D converter 83 and storing the received digital audio data in memory 71. The RTP processor 74 is further capable of converting or encoding the digital audio data to μ-law RTP data packets (i.e., speech packets). The RTP processor 74 is further capable of sending these data packets to the processor 73. In this exemplary embodiment, the RTP processor 74 may be located external to the processor 73. However, in an exemplary embodiment, the RTP processor 74 may be located internal to (and be embodied by) the processor 73.

The processor 73 may include a memory 75 and the processor 73 may be comprised of a microprocessor device, a controller or a co-processor capable of executing a program instructions and processing data and is further capable of receiving data packets from RTP processor 74 associated with audio or speech data that may be stored in memory 75. The processor 73 is further capable of receiving trigger control signals from suspension trigger control 72 which also may be stored in memory 75. The processor 73 is further capable of sending data packets to packet drain device 79 and transceiver 81 as well as sending control signals to packet drain device 79. The suspension trigger control 72 may be any device or means embodied in software and/or hardware capable of receiving control signals (i.e., suspension control signals and network data 77 via TCP/IP socket 17 and is capable of storing the suspension control signals and the network data 77 in memory 19. The suspension trigger control 72 is further capable of evaluating the data within the suspension control signals and the network data 77 to determine whether to activate or turn a trigger "ON," (also referred to herein as ON suspension trigger control signal) or activate or turn a trigger "OFF" (also referred to herein as OFF suspension trigger control signal).

A user (e.g., call agent, supervisor, technician or the like) of IP network 14 is capable of using a button or the like of input device 21 to invoke or activate a suspension control signal. The suspension control signal may be sent from the input device 21 to the suspension trigger control 72 via TCP/IP socket 17. In this regard, the suspension control signal may contain data indicating a length of time (i.e., a time period) that the button is depressed by the user for activation of the suspension control signal. This time period data (i.e., information) contained within the suspension control signal may be evaluated by the suspension trigger control 72 which may notify, via an ON suspension trigger control signal, the processor 73 that suspension of transmission of corresponding data packets is required for the time period, (e.g., 1 sec., etc.). Since the suspended data packets are drained, in the manner discussed below, the notification to the processor 73 that suspension of transmission of corresponding data packets is required effectuates a network-initiated packet level mute function corresponding to the length of time that the button is depressed by the user. The ON suspension trigger control signal, which is sent from the suspension trigger control 72 to the processor 73, may also include data instructing the processor 73 that resumption of the transmission of data packets is required when the time period expires.

Additionally, a user (e.g., technician) who acts on behalf of IP network 14 may define instructions in the network data 77, via a keyboard of input device 21, for example, which invokes or triggers the ON suspension trigger control signal. The network data 77 may be prestored in memory 19 by the user (e.g., technician). For example, data instructions may be defined in the network data 77 specifying to suspend the first 70 ms of speech data associated with a call (or every call) in order to avoid a potential latency period (e.g., time delay of the network (i.e., IP network 14)), for example, or any other suitable data instructions. For instance, data instructions may be defined in the network data specifying to suspend speech data when latency in the network (e.g., IP network 14) increases and the arrival of a call is quicker than the release of a call so as to prevent a subsequent caller from hearing any speech generated by a call agent (e.g., operator), for example, related to a previous call. The suspension of the speech data may occur after a data message to release the call is generated.

Moreover, a user (e.g., call agent) of IP network 14 may define instructions in the suspension control signal(s), via a keyboard of input device 21, for example, which invokes or triggers the ON suspension trigger control signal. For example, data instructions may be defined by the user in the suspension control signal specifying to suspend the first 60 ms of speech data associated with a call originated from a particular network (e.g., IP network 8), for example, or any other suitable data instructions. For instance, a user (e.g., call agent) may define instructions in the suspension control signal(s) to trigger the ON suspension control signal to suspend speech data packets, generated from a voice conversation between the call agent and a user of VoIP communication device 6, or mobile fixed telephone 4, (for example) when a different media stream is being played to the user of VoIP communication device 6, or mobile fixed telephone 4, for example, a media stream such as a generic response system (GRS) recording, a file-based message or any other suitable media stream. In this regard, speech data packets arising from voice conversation between a call agent and a user of VoIP communication device 6 or mobile fixed telephone 4 are prevented from being played over the recording message or the file-based message, which provides better quality.

As noted above, the suspension trigger control 72 is capable of sending the ON suspension trigger control signal and the OFF suspension trigger control signal to the processor 73. The OFF suspension trigger control signal contains data instructing the processor 73 that the audio associated with the data packets stored in memory 75 are not to be suspended (i.e., not drained, in the manner discussed below, and effectively not muted) and instructs the processor 73 to send the data packets stored in memory 73 to the transceiver 81, i.e., bypassing the packet drain device 79. As such, when the OFF suspension trigger control signal is sent by the suspension trigger control 72 to the processor 73, the processor 73 sends the data packets to transceiver 81 which may send (or transmit) the data packets to another user, for example a user of VoIP communication device 6 or traditional mobile/fixed telephone 4 so that the respective user can listen to the audio data associated with the data packets.

On the other hand, when the processor 73 receives an ON suspension trigger control signal from the suspension trigger control 72, the processor 73 may send the packet drain device 79 a control signal(s) having data instructing the packet drain device 79 to suspend the transmission and drain (i.e., overwrite) corresponding data packets, received by the packet drain device 79, for a predetermined time (e.g., 20 ms, corresponding to 160 bytes of the data in the data packets, for example) based on a time period in the control signal and then instructs the packet drain device 79 to resume the transmission of received data packets after the predetermined time period expires. Additionally, when the processor 73 receives the ON suspension trigger control signal from suspension trigger control 72, the processor 73 sends the packet drain device 79 the data packets stored in memory 75. The packet drain device 79 includes a memory 76 which may be a circular buffer. In this exemplary embodiment, the packet drain device 79 may be located external to the processor 73. However, in an alternative exemplary embodiment, the packet drain device 79 may be located internal to and be embodied by the processor 73. The packet drain device 79 may be any device or means in hardware and/or software or a combination of hardware and/or software capable of receiving control signals and data packets from the processor 73 and storing these control signals and data packets in memory 76. Additionally, the packet drain device 79 is capable of sending data packets (i.e., speech packets) having audio data to the transceiver 81, which may send or transmit the data packets to other electronic devices such as, for example, VoIP communication device 6 and/or traditional mobile/fixed telephone 4.

When the packet drain device 79 receives the control signals from processor 73, which instructs the packet drain device 79 that suspension of data packets is required, the packet drain device 79 suspends the transmission of the data packets according to the instructions in the control signal and drains (i.e., overwrites) the suspended data packets by replacing the suspended data packets with new data packets (i.e., destroying or deleting the suspended data packets and replacing the destroyed suspended data packets with new data packets) that are received from processor 73 and stored in memory 76. For example, if the control signal contained data instructing the packet drain device 76 to suspend the first 50 ms of a data packet, the packet drain device 79 would not send the audio data (i.e., speech packets) of the first 50 ms of the data packet to the transceiver 81 but instead the packet drain device 79 instructs the memory 76 to delete the audio data corresponding to the first 50 ms of the data packet and sequentially replace the deleted audio data with newly received audio data. In this regard, suspending the transmission of the audio data and overwriting the suspended audio data effectuates a network level mute which mutes the corresponding audio data that was captured at the microphone 78 of the capture device 71 and which is subsequently suspended and overwritten. The packet drain device 79 sends or outputs the newly received audio data (i.e., speech packets) to the transceiver 81 which may transmit the corresponding data packets to another electronic device such as, for example, VoIP communication device 6 or traditional mobile/fixed telephone 4 so that a user can listen to the corresponding audio data of the speech packets. The suspension of transmission of the audio data in the data packets (e.g., the voice of a user) may occur non-intrusively to the participants of a call (e.g., a call agent (directory assistance operator) and a user of VoIP communication device 6, for example), that is to say without interruption and/or notification to the participants of the call of the instance in which the audio data is suspended. As such, at least one of the participants (e.g., user/subscriber of VoIP communication device) of a call may not know which portion of the other participant's (e.g., call agent) voice conversation was muted.

Figure 7A:
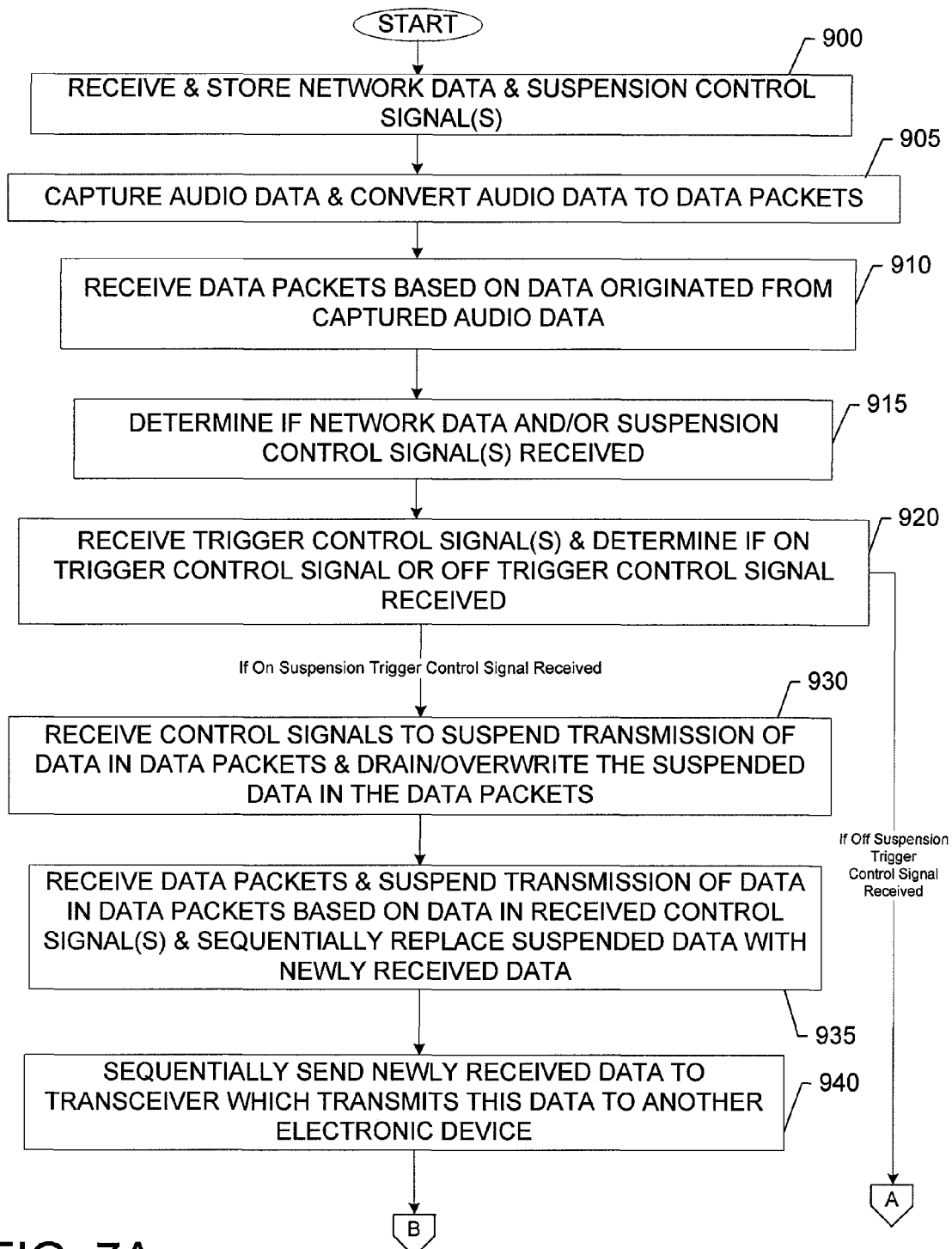
FIGS. 7A & 7B illustrate a flowchart of a method for suspension of transmission of incoming audio data which effectuates a network level mute according to an exemplary embodiment.
Figure 7B:
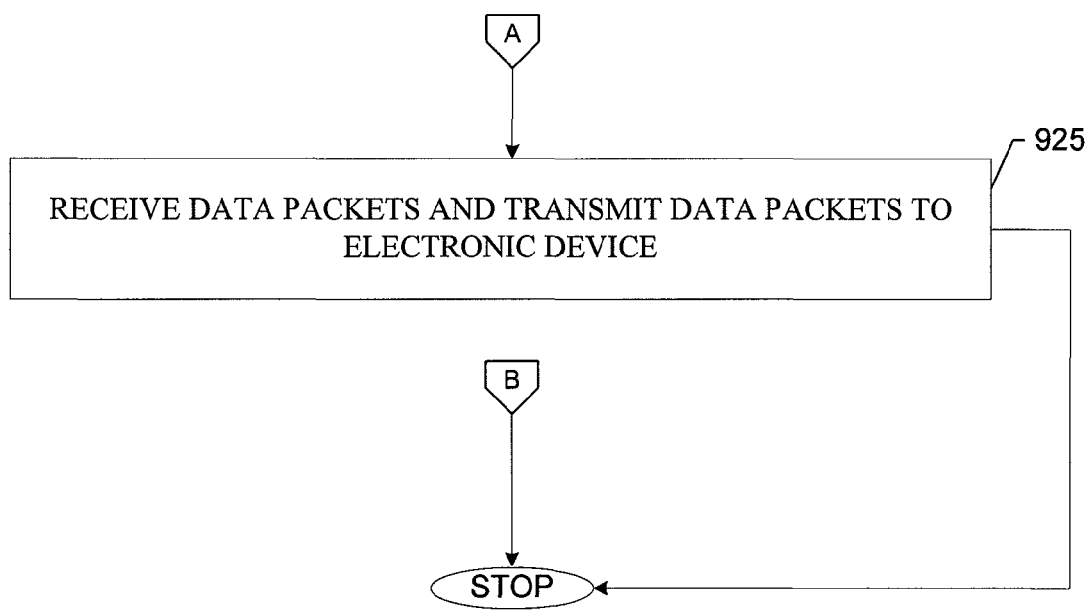

Referring to FIGS. 7A & 7B, a method for suspension of transmission of incoming audio data which effectuates a network level mute according to an exemplary embodiment is provided. At operation 900, the suspension network trigger control 72 receives network data 77 and suspension control signals, via TCP/IP socket 17, which are stored in memory 19. At operation 905, audio data, generated by a user (e.g., voice or a user), for example, via a microphone 78 of a capture device is converted from analog audio data to digital audio data and is then converted into μ-law RTP data packets (i.e., also referred to herein as data packets). At operation 910, the processor 73 receives the data packets sent and generated by the RTP processor 74 which is based on the data captured by the capture device 71. At operation 915, the processor determines if network data and/or suspension control signals are received from the suspension trigger control 72. At operation 920, the processor receives a trigger control signal(s) from the suspension trigger control 72 and determines whether the ON suspension trigger control signal is received or whether the OFF suspension trigger control signal is received.

At operation 925, when the processor 73 determines that the OFF suspension trigger control signal is received, the processor 73 sends the data packets to transceiver 81 which may transmit the data packets to another electronic device, e.g., VoIP communication device 6 or traditional mobile/fixed telephone. At operation 930, if the processor 73 determines that the ON suspension trigger control signal is received, the packet data drain device 79 receives control signals from the processor 73 to suspend the transmission of data packets and drain or overwrite the suspended data packets. At operation 935, the packet drain device 79 receives data packets from the processor 73 and suspends the transmission of data in the data packets based on instructions in the control signal received by packet drain device from the processor 73 and overwrites or sequentially replaces the suspended data of the data packets with newly received data (i.e., speech packets). At operation 940, the packet drain device 79 sends the newly received data to the transceiver 81, which transmits this data (i.e., speech packets) to another electronic device such as VoIP communication device 6 or traditional mobile/fixed telephone 4 so that a user can listen to the audio data provided by the data packets. It should be understood that the packet drain device 79 may sequentially send the newly received data (i.e., in the order it was received by the packet drain device from the processor 73) to the transceiver 81.

It is understood that the operations described for the illustrated methods of FIGS. 3A & 3B, FIGS. 5A & 5B and FIGS. 7A & 7B may be performed through hardware, software, or a combination thereof. Therefore embodiments may take the form of hardware systems and/or apparatuses, software, or a combination thereof. As an example, embodiments may include a computer program product that includes a com- That which is claimed:

1. A method, comprising:
receiving, by a network device, data associated with a communication between two participants;
receiving, by the network device, one or more trigger control signals, the one or more trigger control signals including one or more criteria that relate to when to record information associated with the communication between the two participants;
evaluating, by the network device, the data based on the one or more criteria;
determining, by the network device and based on the evaluation, whether to record the data;
generating, by the network device and based on determining to record the data, one or more copies of the data; and
sending, by the network device and based on generating the one or more copies of the data, a copy, of the one or more copies of the data, to a recipient who differs from the two participants,
the generating of the one or more copies of the data and sending the copy occurring in real-time to enable the recipient to receive the copy during the communication between the two participants.

2. The method of claim 1, further comprising:
monitoring the data without interrupting the communication between the two participates and without enabling the two participants to detect which portion of the communication is being monitored.

3. The method of claim 1, where the sending the copy further comprises:
generating analog sound information corresponding to the data; and
sending the analog sound information to the recipient.

4. The method of claim 1, where the data includes audio data in first format, and
where the method further comprises:
converting the audio data in the one or more copies of the data into a second format that is different than the first format.

5. The method of claim 1, where the one or more trigger control signals include instructions specifying one or more conditions related to when to record the information associated with the communication, and
where the method further includes:
defining the one or more criteria based on the one or more conditions included in the instructions.

6. The method of claim 4, where the second format includes an analog audio format.

7. A method, comprising:
receiving, by a network device, data associated with a communication between two participants;
receiving, by the network device, one or more trigger control signals that include one or more criteria that relate to when to record information associated with the communication between the two participants,
the receiving of the one or more trigger control signals including:
receiving, during a first time period, a first signal that includes the one or more criteria, and
receiving a second signal during a second time period that is subsequent to the first time period;
evaluating, by the network device and based on receiving the second signal, the data based on the one or more criteria;
determining, by the network device and based on the evaluation, whether to record the data;
generating, by the network device and based on determining to record the data, one or more copies of the data; and
sending, by the network device and based on generating the one or more copies of the data, a copy, of the one or more copies of the data, to a recipient who differs from the two participants.

8. A method, comprising:
receiving, by a network device, data associated with a communication between two participants;
receiving, by the network device, one or more trigger control signals that include one or more criteria that relate to when to record information associated with the communication between the two participants,
evaluating, by the network device, the data based on the one or more criteria;
determining, by the network device and based on the evaluation, whether to record the data,
the determining of whether to record the data comprising:
determining, based on evaluating the data, whether to add another participant to the communication or to remove one of the two participants from the communication, and
determining whether to record the data based on determining whether to add the other participant to the communication or to remove the one of the two participants from the communication;
generating, by the network device and based on determining to record the data, one or more copies of the data and
sending, by the network device and based on generating the one or more copies of the data, a copy, of the one or more copies of the data, to a recipient who differs from the two participants.

9. The method of claim 8, where sending the one or more copies of the data to the recipient includes:
determining to add the other participant to the communication;
identifying a network address associated with the other participant; and
sending the one or more copies of the data to the network address associated with the other participant.

10. The method of claim 8, further comprising:
determining to remove a first participant, of the two participants, from the communication; and
forwarding another copy, of the one or more copies of the data, to a second participant, of the two participants, where none of the one or more copies of the data are forwarded to the first participant.

11. An apparatus comprising:
a memory to store instructions; and
a processor to execute the instructions to:
receive data associated with a communication between two participants,
receive one or more trigger control signals associated with one or more criteria that relate to when to record information associated with the communication between the two participants, the one or more trigger control signals including:
a first signal, received during a first period, that includes the one or more criteria, and
a second signal received during a second time period that is subsequent to the first time period,
evaluate, based on receiving the second signal, the data based on the one or more criteria,
determine, based on the evaluation, whether to record the data,
generate, based on determining to record the data, one or more copies of the data, and
send, based on generating the one or more copies of the data, a copy, of the one or more copies of the data, to a recipient who differs from the two participants.

12. The apparatus of claim 11, where the processor is further to:
monitor the data without interrupting the communication between the two participants and without enabling the two participants to determine which portion of the communication is being monitored.

13. The apparatus of claim 11, where the processor, when sending the copy, is further to:
generate analog sound information corresponding to the data, and
send the analog sound information to the recipient.

14. The apparatus of claim 11, where the data includes audio data in a first format, and
where the processor is further to:
convert the audio data in the one or more copies of the data into a second format that is different than the first format.

15. The apparatus of claim 11, where the one or more trigger control signals include instructions specifying one or more conditions related to when to record the information associated with the communication, and
where the processor is further to:
define the one or more criteria based on the one or more conditions included in the instructions.

16. The apparatus of claim 14, where the second format includes an analog audio format.

17. An apparatus comprising:
a memory to store instructions; and
a processor to execute the instructions to:
receive data associated with a communication between two participants,
receive one or more trigger control signals associated with one or more criteria that relate to when to record information associated with the communication between the two participants,
evaluate the data based on the one or more criteria,
determine, based on the evaluation, whether to record the data,
generate, based on determining to record the data, one or more copies of the data, and
send, based on generating the one or more copies of the data, a copy, of the one or more copies of the data, to a recipient who differs from the two participants,
the processor generating the one or more copies of the data and sending the copy in real-time, to the recipient, during the communication between the two participants.

18. An apparatus comprising:
a memory to store instructions; and
a processor to execute the instructions to:
receive data associated with a communication between two participants,
receive one or more trigger control signals associated with one or more criteria that relate to when to record information associated with the communication between the two participants,
evaluate the data based on the one or more criteria,
determine, based on the evaluation, whether to record the data, the processor, when determining whether to record the data being further to:
determine, based on the evaluation, whether to add another participant to the communication or to remove one of the two participants from the communication, and
determine whether to record the data based on determining whether to add the other participant to the communication or to remove the one of the two participants from the communication;
generate, based on determining to record the data, one or more copies of the data, and
send, based on generating the one or more copies of the data, a copy, of the one or more copies of the data, to a recipient who differs from the two participants.

19. A non-transitory memory device to store instructions, the instructions comprising:
one or more instructions which, when executed on a computer device, cause the computer device to receive data associated with a communication between two participants;
one or more instructions which, when executed on the computer device, cause the computer device to receive one or more trigger control signals, the one or more trigger control signal including:
one or more criteria that relate to when to record information associated with the communication between the two participants;
the one or more instructions to receive the one or more trigger control signals further including:
one or more instructions to receive, during a first time period, a first signal that includes the one or more criteria, and
one or more instructions to receive a second signal during a second time period that is subsequent to the first time period;
one or more instructions which, when executed on the computer device, cause the computer device to evaluate, based on receiving the second signal, the data based on the one or more criteria;
one or more instructions which, when executed on the computer device, cause the computer device to determine, based on the evaluation, whether to record the data;
one or more instructions which, when executed on the computer device, cause the computer device to generate, based on determining to record the data, one or more copies of the data; and
one or more instructions which, when executed on the computer device, cause the computer device to send, based on generating the one or more copies of the data, a copy, of the one or more copies of the data, to a recipient who differs from the two participants.

20. The non-transitory memory device of claim 19, where the instructions further comprise:
one or more instructions to monitor the data without interrupting the communication between the two participants and without enabling the two participants to determine which portion of the communication is being monitored.

21. The non-transitory memory device of claim 19, where the one or more instructions to send the copy include:
    one or more instructions to generate analog sound information corresponding to the data; and
    one or more instructions to send the analog sound information to the recipient.

22. The non-transitory memory device of claim 19, where the data includes audio data in a first format, and
    where the instructions further comprise:
        one or more instructions to convert the audio data in the one or more copies of the data into a second format that is different than the first format.

23. The non-transitory memory device of claim 19, where the one or more trigger control signals include instructions specifying one or more conditions related to when to record the information associated with the communication, and
    where the instructions further comprise:
        one or more instructions to define the one or more criteria based on the one or more conditions included in the instructions.

* * * * *